(12) United States Patent
Mireku

(10) Patent No.: US 7,207,002 B2
(45) Date of Patent: Apr. 17, 2007

(54) SERIALIZATION AND PRESERVATION OF OBJECTS

(75) Inventor: Kwabena A. Mireku, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/712,238

(22) Filed: Nov. 13, 2003

(65) Prior Publication Data

US 2005/0108627 A1    May 19, 2005

(51) Int. Cl.
G06F 7/00        (2006.01)

(52) U.S. Cl. .................. 715/513; 715/511; 717/144; 717/115; 717/116

(58) Field of Classification Search ............. 715/511, 715/513; 719/315; 717/108, 116, 115, 144
See application file for complete search history.

(56) References Cited

U.S. PATENT DOCUMENTS

| | | |
|---|---|---|
| 6,298,353 B1 | 10/2001 | Apte |
| 6,301,585 B1 | 10/2001 | Milne |
| 6,330,569 B1 | 12/2001 | Baisley et al. |
| 6,389,592 B1 | 5/2002 | Ayres et al. |
| 6,408,311 B1 | 6/2002 | Baisley et al. |
| 6,477,701 B1 | 11/2002 | Heistermann et al. |
| 2004/0230896 A1* | 11/2004 | Elza et al. ............ 715/511 |
| 2004/0243645 A1* | 12/2004 | Broder et al. ............ 707/200 |
| 2004/0267760 A1* | 12/2004 | Brundage et al. ........ 707/100 |
| 2004/0268242 A1* | 12/2004 | Layman et al. ........... 715/513 |

OTHER PUBLICATIONS

Maeda, Kazuaki, 'Development of Soccer Agents with Soccer Migration', Proceedings of 1999 IEEE International Conference on Systems, Man, and Cybernetics (IEEE SMC 1999), Oct. 1999, vol. 6, p. 750-755.*

Spreitzer, Mike et al. "More Flexible Data Types", Proceedings of IEEE Eighth International Workshop on Enabling Technologies: Infrastructure for Collaborative Enterprises (Wet Ice 1999), Jun. 1999, p. 319-324.

(Continued)

Primary Examiner—Stephen Hong
Assistant Examiner—Matt Ludwig
(74) Attorney, Agent, or Firm—Marcia L. Doubet; Gerald R. Woods

(57) ABSTRACT

Techniques are disclosed for serializing objects (such as Java™ objects), and deserializing those objects, in a manner that enables contents of the objects to be preserved following changes to definitions of the object structures. Objects are serialized using documents encoded in a markup language (such as Extensible Markup Language, or "XML"). The serialized objects thereby capture class definition information for the class definition which was in effect when the object was serialized. Subsequently, if the class definition is changed, techniques disclosed herein enable deserializing the information from the markup language document to an object that uses the new class definition, without requiring access to a programming language specification of the now-obsolete class definition.

13 Claims, 27 Drawing Sheets

OTHER PUBLICATIONS

Maeda, Kazuaki "Development of Soccer Agents with Soccer Migration", Proceedings of 1999 IEEE International Conference on Systems, Man, and Cybernetics (IEEE SMC 1999), Oct. 1999, vol. 6, p. 750-755.

Ort, Ed et al. "Java Architecture for XML Binding (JAXB)", Mar. 2003, Sun Microsystems, Inc., Oct. 24, 2003, <http://developer.java.sun.com/developer/technicalArticles/WebServices/jaxb/> (p. 1-18).

"Java Architecture for XML Binding (JAXB)", Oct. 22, 2003, Sun Microsystems, Inc., Oct. 24, 2003, <http://java.sun.com/xml/jaxb/> (p. 1-2).

"Introduction", The Skaringa Team, Oct. 24, 2003, <http://skaringa.sourceforge.net/> (p. 1-2).

"Documentation", The Skaringa Team, Oct. 24, 2003, <http://skaringa.sourceforge.net/doc.html> (p. 1-20).

* cited by examiner

FIG. 6

```xml
<?xml version="1.0"?>

<company name="Acme" url="http://acme.com">
    <employee name="Paul" officeNumber="400"/>
    <employee name="John" officeNumber="500"/>
</company>
```

FIG. 12

```xml
<?xml version="1.0"?>
<object name="bill" className="Employee">

<class name="Person" serialVersion="12345">
    <special-object name="name" className="java.lang.String" value="William"/>
    <primitive name="age" className="int" value="20"/>
</class>

<class name="Employee" serialVersion="67890">
    <special-object name="title" className="java.lang.String" value="Engineer"/>
    <primitive name="officeNumber" className="long" value="117"/>
</class>

</object>
```

910 Class Person
{
    public String name;
    private int age;
    ...
}

...

920 Class Employee extends Person
{
    protected String title;
    protected long officeNumber;

public Employee(String name, int age, String title, long officeNumber) { ... }
    ...
}

...

// Create a new instance of an employee
930 Employee bill = new Employee("William", 20, "Engineer", 117);

FIG. 17A (Prior Art)

```
class ABC implements Serializable
{
int A;
boolean B;
...
}
```
1700

FIG. 17B (Prior Art)

```
class ABC implements Serializable
{
int A;
boolean B;
string C;
...
}
```
1750

FIG. 17C (Prior Art)

```
class ABC implements Serializable {
static final long serialVersionUID = 1111222233334444L;
int A;
boolean B;
string C;
...
}
```
1790

FIG. 22

```
2200  public abstract class Person
  2210    implements Serializable, SerializedObjectImporter
         {
             protected String GUEST_ACCOUNT[ ] =
                 new String[ ] {"unix", "guest", "secret"};

2220     private String name;
           private String address;
           private Vector accounts = new Vector();

/** Constructor */
           public Person(String name, String address)
           {
                 this.name = name;
                 this.address = address;
                 accounts.add(GUEST_ACCOUNT);    2230
           }

/** Member functions */
           public String getName()    { return name; }
           public String getAddress() { return address; }

/**
            * Imports a serialized object into this object.  This function is
            * called by the default deserializer for each object to customize
            * the import of the serialized object.  The default object importer
            * may be called from this function to perform the default import.
            *
            * @param serialHandle Serialized object handle.
            * @param userObject   Serialized user object.
            */
  2240     public void customObjectImport(Object serialHandle, UserObject userObject)
                   throws XMLObjectStreamException, ClassNotFoundException
           {
                 // Perform the default object import at the root class
                 userObject.defaultObjectImport(serialHandle, this);

// Get the serialized class entry for this class
                 UserClass userClass = userObject.getClass(Person.class);

// Perform manual import of changed and new fields
                 if (userClass.isClassDifferent(this)) {}
           }                                              2250
         }
```

FIG. 23

```
2300 public class Employee extends Person
     {
            ┌ private int officeNumber;
     2310 │ private String emailAddress;
            │ private Date creationDate;
            └ private Vector roles = new Vector();

/** Constructor */
     2320 public Employee(String name, String address,
                          int officeNumber, String emailAddress)
            {
                    super(name, address);
                    this.officeNumber = officeNumber;
                    this.emailAddress = emailAddress;
            ┌ this.creationDate = new Date();
            │
     2330 │ // Create the roles
            │ this.roles.add("Administrator");
            └ this.roles.add("Manager");
            }

/** Member functions */
        public int getOfficeNumber()  { return officeNumber; }
        public String getEmailAddress() { return emailAddress; }
        public String getDateHired()  { return creationDate.toString(); }

/** Displays user information */
        public void displayUserInformation()
        {
                    System.out.println("\nEmployee Information (Employee)");
                    System.out.println("\tName: " + getName());
                    System.out.println("\tAddress: " + getAddress());
                    System.out.println("\tOffice number: " + getOfficeNumber());
                    System.out.println("\tEmail address: " + getEmailAddress());
                    System.out.println("\tDate Hired: " + getDateHired());
                    System.out.println("\tRoles: " + roles.elementAt(0).toString() + ", "
                          + roles.elementAt(1).toString());
        }
```

FIG. 24

2400 import util.xml.stream.*;
import util.xml.objectstream.*;

...

FileInputStream fsi;
FileOutputStream fso;
XMLObjectInputStream xsi;
XMLObjectOutputStream xso;
Employee employee;

// Create a new object
2410 employee = new Employee("Michael Smith", "2400 Oak Street", 17,
"michael@internet.com");
2420 employee.displayUserInformation();

2430
// Write XML serialized object
fso = new FileOutputStream("output.xml");
xso = new XMLObjectOutputStream(fso);
xso.writeObject(employee);
xso.close();

2440
// Discard the object
employee = null;

2450
// Read XML serialized object
fsi = new FileInputStream("output.xml");
xsi = new XMLObjectInputStream(fsi);
employee = (Employee) xsi.readObject();
employee.displayUserInformation();
xsi.close();

*2510* Employee Information (Employee)
  Name: Michael Smith
  Address: 2400 Oak Street
  Office number: 17
  Email address: michael@internet.com
  Date Hired: Thu Aug 14 14:30:30 EDT 2003
  Roles: Administrator, Manager

*2520* Employee Information (Employee)
  Name: Michael Smith
  Address: 2400 Oak Street
  Office number: 17
  Email address: michael@internet.com
  Date Hired: Thu Aug 14 14:30:30 EDT 2003
  Roles: Administrator, Manager

FIG. 26

```xml
<?xml version="1.0" encoding="UTF-8" ?>
<serialized method="reflect-java-xml" version="1.0">
<object class="Employee" reference="1">
  <class name="Employee" version="-7349900520304056087">
    <special-object name="roles" class="java.util.Vector" method="construct" reference="2">
      <special-object class="java.lang.String" value="Administrator" method="construct" reference="3" />
      <special-object class="java.lang.String" value="Manager" method="construct" reference="4" />
    </special-object>
    <special-object name="creationDate" class="java.util.Date" method="construct" reference="5" value="1060885830375" />
    <special-object name="emailAddress" class="java.lang.String" value="michael@internet.com" method="construct" reference="6" />
    <primitive name="officeNumber" class="int" value="17" />
  </class>
  <class name="Person" version="-3933595787279955677">
    <special-object name="accounts" class="java.util.Vector" method="construct" reference="7">
      <array class="[Ljava.lang.String;" length="3" reference="8" method="construct" reference="9" />
        <special-object class="java.lang.String" value="unix" method="construct" reference="9" />
        <special-object class="java.lang.String" value="guest" method="construct" reference="10" />
        <special-object class="java.lang.String" value="secret" method="construct" reference="11" />
      </array>
    </special-object>
    <special-object name="address" class="java.lang.String" value="2400 Oak Street" method="construct" reference="12" />
    <special-object name="name" class="java.lang.String" value="Michael Smith" method="construct" reference="13" />
    <array name="GUEST_ACCOUNT" class="[Ljava.lang.String;" length="3" reference="8" link="yes" />
  </class>
</object>
</serialized>
```

FIG. 27A

2700 public class NewEmployee extends Person2710
{

2720
```
private String officeNumber;        // ** Modified type **
//private String emailAddress;      // ** Deleted field **
private String title;               // ** Added field **
private Date dateHired;             // ** Renamed field **
private String roles[ ];            // ** Modified type **
```

```
/** Constructor */
```
2730 public NewEmployee(String name, String address, String officeNumber)
```
{
        super(name, address);
        this.officeNumber = officeNumber;
        this.title = "Associate";
        this.dateHired = new Date();

// Create the roles
        this.roles = new String[ ] {"Developer", "Tester"};
}

/*** Member functions */
public String getOfficeNumber() { return officeNumber; }
public String getTitle()        { return title; }
public String getDateHired()    { return dateHired.toString(); }

/** Displays user information */
public void displayUserInformation()
{
        System.out.println("\nEmployee Information (NewEmployee)");
        System.out.println("\tName: " + getName());
        System.out.println("\tAddress: " + getAddress());
        System.out.println("\tOffice number: " + getOfficeNumber());
        System.out.println("\tTitle: " + getTitle());
        System.out.println("\tDate Hired: " + getDateHired());
        System.out.println("\tRoles: " + roles[0] + ", " + roles[1]);
}
```

FIG. 27B

```
/**
 * Imports a serialized object into this object. This function is
 * called by the default deserializer for each object to customize
 * the import of the serialized object. The default object importer
 * may be called from this function to perform the default import.
 *
 * @param serialHandle Serialized object handle.
 * @param userObject   Serialized user object.
 */
public void customObjectImport(Object serialHandle, UserObject userObject)
        throws XMLObjectStreamException, ClassNotFoundException
{
        // Invoke super classes to perform class specific imports
        super.customObjectImport(serialHandle, userObject);

// Get the serialized class entry for this class
2750    userObject.changeClassName("Employee", "NewEmployee", true);
        UserClass userClass = userObject.getClass(NewEmployee.class);

// Perform manual import of changed and new fields
2760    if (userClass.isClassDifferent(this))
            {
2770        officeNumber = userClass.getField("officeNumber").getValue();
2780        title = "Engineer ("+userClass.getField("emailAddress").getValue()+")";
2790        dateHired =
                    (Date) userClass.getField("creationDate").deserialize(serialHandle);

// Convert the roles from a Vector to a String array
            Vector rolesData =
                (Vector) userClass.getField("roles").deserialize(serialHandle);
2795        roles = (String[ ]) rolesData.toArray(new String[rolesData.size()]);
            }
    }
}
```

2740 brackets the `public void customObjectImport` block.

FIG. 28

2800
```
// Open the XML file containing the previously serialized object
fsi = new FileInputStream("output.xml");

// Specifying the serializer allows partial or complete control
// over the serialization and deserialization of the object.
// The default serializer may be extended to update class names
// before deserialization. Specifying the default serializer
// is equivalent to not specifying it at all, with the present API.
xsi = new XMLObjectInputStream(fsi, new DefaultXMLSerializer());

// Read XML serialized object into a different class.
// If the default serializer was extended to change the class
// name from 'Employee' to 'NewEmployee', then the readObject()
// below could be called without any parameters.
```
2810
```
NewEmployee newEmployee =
    (NewEmployee) xsi.readObject(new NewEmployee("", "", ""));
newEmployee.displayUserInformation();
```

FIG. 29

2900
Employee Information (NewEmployee)
    Name: Michael Smith
    Address: 2400 Oak Street
    Office number: 17
2910 Title: Engineer (michael@internet.com)
    Date Hired: Thu Aug 14 14:30:30 EDT 2003
    Roles: Administrator, Manager

FIG. 30

Grammar

| | |
|---|---|
| stream | ::= header serialized-object |
| serialized-object | ::= element("serialized", object) |
| object | ::= user-object \| special-object \| array \| primitive |
| user-object | ::= element("object", 0*user-class) |
| user-class | ::= element("class", 0*object) |
| special-object | ::= element("special-object", 0*object) |
| array | ::= element("array", 0*object) |
| primitive | ::= element("primitive") |

Literals

| | |
|---|---|
| header | ::= <XML version control header> |
| element(tagname) | ::= <XML element with specified tag name and zero children> |
| element(tagname,child) | ::= <XML element with specified tag name and child elements> |

Tag Attributes serialized: method version
class: name version
object: [name] class reference [link]
array: [name] class reference [link] length
special-object: [name] class [value] reference [link] method
primitive: [name] class value

SERIALIZATION AND PRESERVATION OF OBJECTS

BACKGROUND OF THE INVENTION

Reservation of Copyright

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

1. Field of the Invention

The present invention relates to computer programming, and deals more particularly with techniques for serializing objects (such as Java™ objects), and deserializing those objects, in a manner that enables contents of the objects to be preserved following changes to definitions of the object structures.

2. Description of the Related Art

For data transfer in distributed computing environments, as well as for storing data persistently, it becomes necessary to convert data structures between object format and serialized format. For example, such structured objects may be used when writing programs in the Java™ programming language. ("Java" is a trademark of Sun Microsystems, Inc.) The term "serialization" is used in the art to describe the process of taking an object and transforming it to a "flattened" data structure so that, for example, the contents of the object can be persistently stored or can be passed over a network connection in a serial or stream format. "Deserialization" then refers to the reverse process, whereby a flattened data structure is converted into object format.

Changes in class definitions are a typical occurrence when a new version of a software product is being created. The changes may correct errors that have been discovered in an earlier version, or new features may be added to the software product which necessitate revising the class definitions. Since newer versions of a product may contain changes to classes whose objects have been previously serialized, migration of the previously-serialized objects is generally necessary when a customer upgrades to a newer version of the product.

Several prior art migration techniques are known for performing migration of objects. Each of the known techniques suffers from drawbacks, however. Three migration techniques of the prior art will now be described, and difficulties encountered with each technique will also be described.

In a first approach, which is suitable for moderate changes to class definitions, Java serialization extensions provide some accommodation to handle new and changed attributes to objects that were serialized using standard Java serialization. However, this approach does not easily allow for more drastic changes, such as a restructuring of the class hierarchy or the changing of class names. It also does not easily provide direct access to the attributes of the previously-serialized object, which may be needed to construct the new object.

Another prior art approach for migration of objects is the use of a migration tool that reads each old object from storage, in turn, into an instantiation of the original class. An object according to the new class definition is then constructed from each old object. A major drawback of this solution is that it requires the old and new class definitions to be included with the product in order to perform the migration. Also, the migration process becomes complicated when the old and new classes have the same name.

A third prior art approach for migration of objects is to bypass Java serialization altogether, and store the object's attributes directly using getters and setters. A major drawback of this solution is that it requires the implementation of getters and setters in each class. A programmer needs to write code to save and restore the state of each serializable class, and must continually perform maintenance on the code as the class definition changes. Thus, this approach is time consuming, cumbersome, and error prone (and therefore expensive).

As an alternative to migrating the previously-serialized objects, users of the software product in which class definitions have changed might be required to simply eliminate all of those serialized objects and start anew to create objects using the new class definitions. For example, when serialized objects represent outstanding transactions of some type, a requirement to complete all of the transactions before upgrading to the new software might be imposed. However, this is a burdensome approach in most situations, and is therefore undesirable.

Accordingly, what is needed are techniques that enable programmatic migration of serialized objects following changes to definitions of the object structures, such that existing serialized objects are preserved, while avoiding drawbacks of prior art techniques.

SUMMARY OF THE INVENTION

An object of the present invention is to define techniques for programmatically migrating serialized objects following changes to definitions of the object structures.

Another object of the present invention is to provide programmatic version migration techniques which do not require products to include back-level versions of the classes for objects to be migrated.

Still another object of the present invention is to provide techniques that enable existing serialized objects to be preserved following changes to definitions of the object structures.

Yet another object of the present invention is to provide programmatic version migration techniques which enable programmer access to individual object attributes.

Still another object of the present invention is to provide programmatic migration techniques which enable automatic notification (such as exception generation) if migration software has not been provided for objects having a changed definition.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides improved methods, systems, and computer program products that enable programmatic migration of serialized objects. In one embodiment, the present invention comprises: serializing software objects by creating, for an object to be serialized to a persistent store, a graph structure comprising nodes that embody serializable attributes and values thereof; and writing the graph structure to the persistent store as a markup language document. The markup language document may be encoded, for example, in Extensible Markup Language ("XML") notation. Preferably, the nodes are written as markup language elements in the markup language document and reflect a structure of the object (e.g., in hierarchical relationships among the markup language elements) according to one or more class definitions to which the object adheres. The attribute values are preferably reflected in attributes of the markup language elements. A new instance of the object may be created by deserializing the markup language document.

In another embodiment, the present invention provides techniques for enabling serialized objects to be preserved following changes to one or more class definitions used in those objects, comprising: creating, for an object to be serialized to a persistent store, a graph structure comprising nodes that embody a structure of the object and values of serializable attributes of the object; writing the graph structure to the persistent store, such that serializable information from one or more original class definitions to which the object adheres is persistently captured; programmatically determining, in order to deserialize the persistently captured information to a new instance of the object, whether serializable attribute definitions for the original class definitions, as reflected in the graph structure, are identical to serializable attribute definitions of one or more current class definitions to which the new instance must adhere; and deserializing the new instance of the object directly from the serializable information persistently captured within the graph structure, if the programmatic determination has a positive result, and performing a programmatic migration of the attribute values from the serializable information persistently captured with the graph structure otherwise. Preferably, the graph structure is written to the persistent store as a markup language document. Performing the programmatic migration may further comprise directly accessing individual attribute values from the persistently-captured serializable information.

In yet another embodiment, the present invention provides techniques for deserializing software objects, comprising: creating, from a markup language document written to a persistent store, a corresponding graph structure, wherein elements of the markup language document and nodes of the corresponding graph structure embody serializable attributes and values of an object and wherein the markup language document reflects one or more original class definitions to which the object adhered when the markup language document was created; and deserializing a new instance of the object from the graph structure.

In another embodiment, the present invention provides a data structure for enabling serialized objects to be preserved following changes to one or more class definitions used in those objects, the data structure embodied on a computer-readable medium and comprising a specification of a structure of an object according to one or more class definitions to which the object adheres and values of serializable attributes of the object, according to the one or more class definitions, such that the data structure is usable for deserializing a new instance of the object according to one or more current class definitions to which the new instance must adhere. Preferably, the specification of the serialized object comprises a markup language document representation.

The present invention will now be described with reference to the following drawings, in which like reference numbers denote the same element throughout.

BRIEF DESCRIPTION OF THE DRAWINGS

FIG. 6 provides a sample XML document used to illustrate techniques of the present invention.

FIG. 9 provides sample programming code that creates an object, and FIGS. 10–12 depict a sample Serialized Object Model graph, Document Object Model graph, and XML document that may be used to represent this object, respectively;

FIGS. 17A–17C illustrate an example of declaring the stream-unique serialVersionUID for a class definition, according to the prior art;

FIGS. 22–24 provides sample programming code used to illustrate creation of an object and then serializing and deserializing that object according to preferred embodiments, FIG. 25 illustrates a result of executing that code, and FIG. 26 depicts a sample XML document that may be created to serialize the object according to preferred embodiments;

FIGS. 27–29 illustrate how the object class definition in the sample code of FIGS. 22–24 might be changed and how a previously-serialized object may be restored using that changed definition, according to preferred embodiments; and FIG. 30 provides a sample grammar that may be used for markup language documents that embody serialized objects, according to preferred embodiments of techniques disclosed herein.

DESCRIPTION OF PREFERRED EMBODIMENTS

The present invention defines novel techniques for serializing objects, and deserializing those objects, in a manner that enables contents of the objects to be preserved following changes to definitions of the object structures. Objects are serialized in a novel manner, and deserialization of those serialized objects is achieved in a novel manner. The disclosed techniques enable efficient programmatic migration of serialized objects after a new version of an object's class definition is deployed. Preferred embodiments are described herein with reference to serialized objects created in, and used by, Java software products. The disclosed techniques may, however, be adapted for use with other programming languages, and thus references to Java serialization are by way of illustration and not of limitation.

A model is defined for saving and restoring the state of an object, and regardless of the changes that may have been made to the object's class definition, this model allows objects that have been saved to persistent storage in serialized form to be efficiently migrated to the new version of the class definition.

Figure 1:
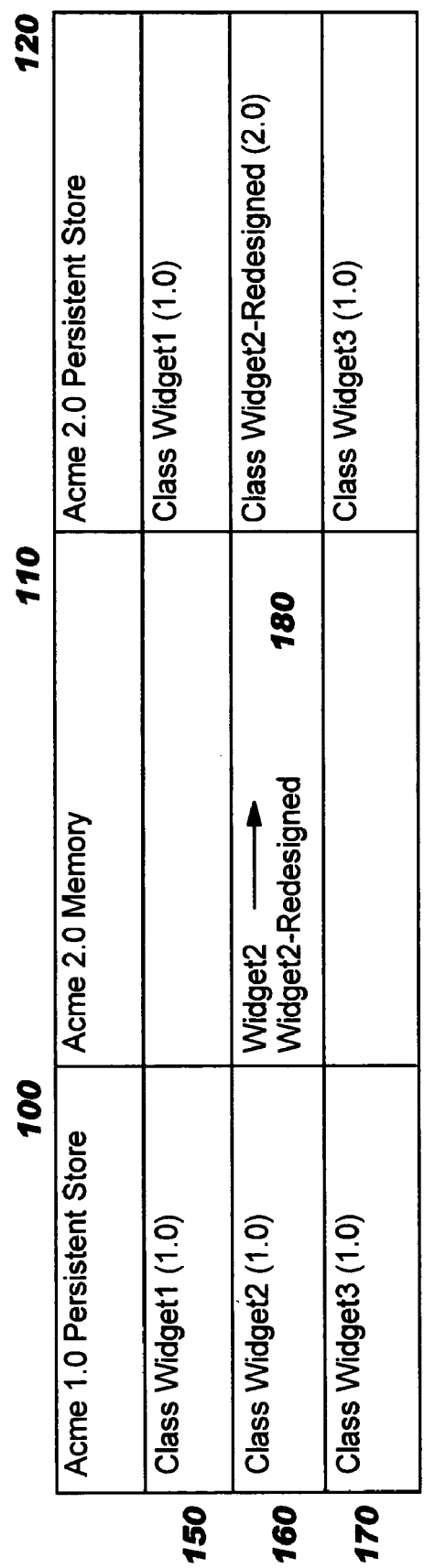
FIG. 1 illustrates a real-time migration scenario, according to preferred embodiments of the present invention.

In preferred embodiments, the model disclosed herein replaces the services of standard Java serialization with XML serialization. This model gives the programmer direct access to the contents of a serialized object's attributes, which are sometimes necessary to migrate the serialized object to the new class definition. As a result of using XML serialization as disclosed herein, instead of standardization techniques of the prior art, the present invention provides a mechanism for real-time migration of the serialized object (and enables effectively extending the serialization process, as contrasted to the prior art). This real-time migration is illustrated in the scenario depicted in FIG. 1, for a software product called "Acme". In this example, a customer using a product version termed "Acme 1.0" (see column 100) persists data for three different object types, which are referred to in FIG. 1 as objects from "Widget1" class 150, "Widget2" class 160, and "Widget3" class 170. In a subsequent product version termed "Acme 2.0", the Widget2 class is redesigned. After the customer upgrades from Acme 1.0 software to Acme 2.0 software, a deserialization operation performed by preferred embodiments of the present invention causes a Widget2 object to be deserialized. As the object is being deserialized, the real-time migration reads the contents of Widget2 objects according to the now-obsolete Widget2 class into instances of the now-updated class, which in the example is referred to as "Widget2-Redesigned". See reference number 180 in FIG. 1, representing creation of objects in memory during deserialization (as shown in column 110). (Note that while a new class name is used for the revised class definition in this example, this is merely for emphasizing the class definition change. Importantly, the techniques disclosed herein work equally well for migration scenarios in which the class name remains the same from one version to another.) After the object adhering to the Widget2-Redesigned class is serialized, the persistent store now contains the new class definition (as shown in column 120). In a similar manner, as each persisted object is deserialized, the serialized objects are gradually migrated to the new class definitions.

After each object has been migrated, this one-time migration performed during deserialization no longer occurs. In this example, the only additional code the programmer writes is the code to update the new and changed fields in Widget2-Redesigned. Other than that, serialization and deserialization of all objects are handled completely by components referred to herein as an XML serialization engine and an XML deserialization engine. A brief description of these engines will now be provided, after which more detailed discussions follow. (Note that while these are described as separate components, this is for illustrative purposes. An implementation of the present invention may choose to combine serialization and deserialization functions into a single component.)

Figure 2:
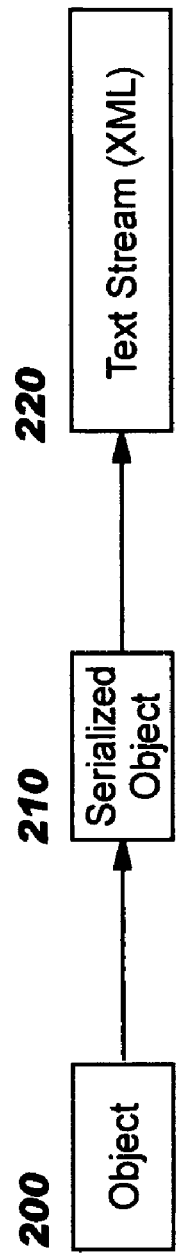
FIGS. 2 and 4 depict serialization and deserialation models used by preferred embodiments, and FIGS. 3 and 5 provide Java serialization and deserialization models of the prior art.
Figure 3:

According to techniques of preferred embodiments, the serialization of an object is performed by an XML serialization engine that uses Java reflection to recursively read the attribute names and values of each object and its references. The class and attribute information is subsequently serialized as (i.e., stored in) a markup language document which, by way of illustration but not of limitation, is referred to herein as an XML document. This new serialization model is depicted in FIG. 2. By way of contrast, the prior art Java serialization model is depicted in FIG. 3.

Figure 4:
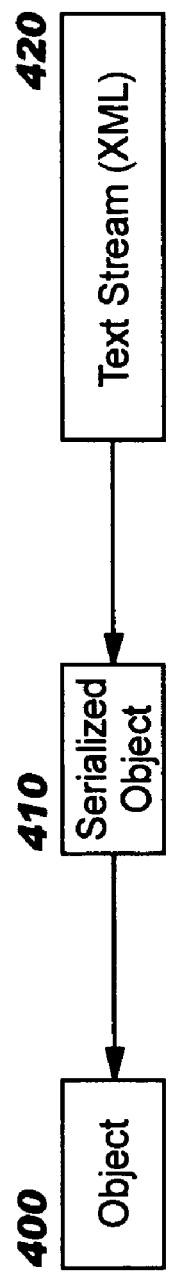
Figure 5:
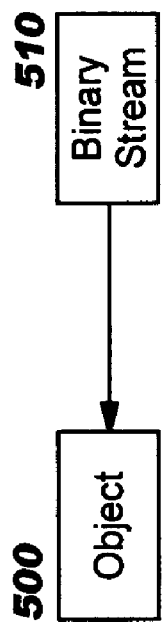

Deserialization of an object, according to techniques of preferred embodiments, is performed in two steps by an XML deserialization engine as disclosed herein. This new deserialization model is depicted in FIG. 4. First, the XML document created by the XML serialization engine (referred to in FIG. 4 as a text stream 420) is restored into a data structure (see reference number 410) that represents the original class definition. This data structure operates as an intermediary object, and is referred to herein as a "SerializedObject". This intermediary object is a graph, in preferred embodiments, that captures the structure of the old class definition, but is not dependent on the existence of the old class definition. Thus, it is not necessary to include both the old and new class definitions when delivering updated software products to customers when using techniques disclosed herein, thereby providing significant advantages over prior art migration techniques. The graph used to represent a SerializedObject in preferred embodiments is described in more detail with reference to FIG. 8. From this SerializedObject representation 410, an object 400 (which transparently reflects changes to the object's class definition) is created using Java reflection. By way of contrast to FIG. 4, the prior art Java deserialization model is depicted in FIG. 5.

The deserialization engine of preferred embodiments performs what is referred to herein as "best effort' attempt at restoring attribute values from serialized objects. In other words, attributes whose names and types have not been changed are restored automatically. However, attributes that have changed are skipped by the engine, making it the programmer's responsibility to provide class-specific code to restore new and changed attributes. Preferably, a serial version identifier of a serialized object is used to determine whether the object's class definition has changed (as will be described in more detail below). If a class has changed, then custom code written by the programmer to address these changes is invoked by the deserialization engine. According to preferred embodiments, this custom code is placed inside the new class definition. (Examples are described with reference to FIGS. 22 and 26.)

During deserialization, the custom code is invoked to handle the migration of the new and changed attributes. Since the deserialization engine provides the programmer direct access to every attribute in the old class definition (via the XML document in which the object was serialized and the SerializedObject graph in which the old class definition is reflected), the new object may be constructed from the ground up using the attributes from the old object. Thus, this model provides a mechanism for the preservation of serialized objects across different versions of a software product, allowing for the most extreme forms of object transformation.

Referring again to FIG. 5, when an object is deserialized using standard Java features, the object is restored (see reference number 500) using serialized data which has been stored as a binary stream (see reference number 510). In contrast, as depicted in FIG. 4, the deserialization techniques of preferred embodiments of the present invention will create an intermediary object (see reference number 410) as a representative of the original (i.e., previously-serialized) object which has been persisted to a text stream in XML format (see reference number 420). This intermediary object 410 will subsequently be used to reconstitute a version of the original object, shown in FIG. 4 at reference number 400 (where this version 400 now adheres to the changed class definition).

As shown in FIG. 4, the intermediary object 410 will represent the serialized object 420, containing all the information required to recreate the object at 400. The intermediary object 410 will not have any dependency on the existence of the original object's classes, allowing the restored (i.e., migrated) object 400 to differ significantly from its serialized form 420. In order to perform a transformation of an object during deserialization, custom code may be added to the new class to accommodate changes that may have been made to the original class definition. (Examples showing how this custom code is added, in preferred embodiments, are described below with reference to FIGS. 22 and 26.)

Figure 7:
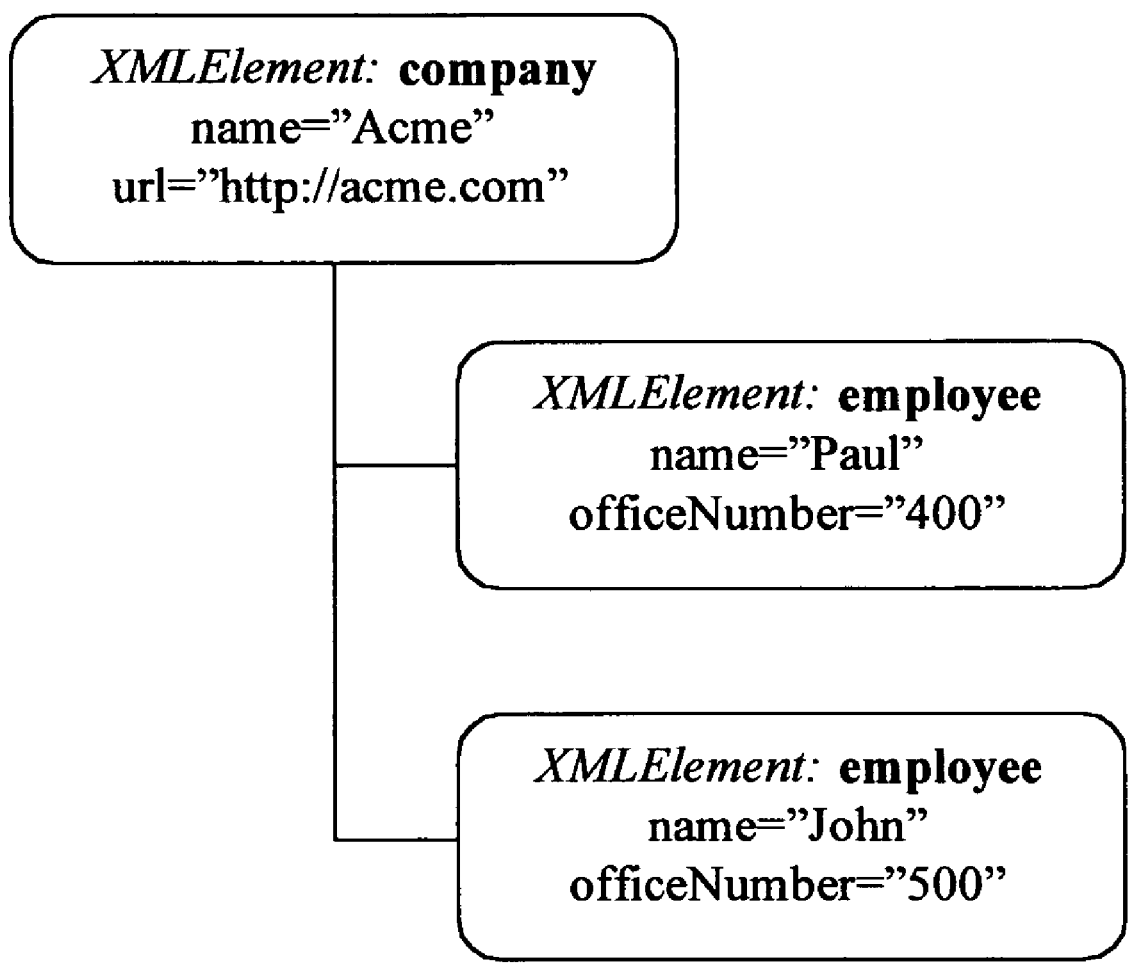
FIG. 7 depicts a corresponding graph representation thereof.

The XML data format is well suited for storing data that is hierarchical in nature, and can be adapted for storing information that is object-oriented, such as the object formats described herein. In FIG. 6, an XML document 600 providing sample XML data for a company and its employees is illustrated. This same data can also be represented as a graph, where each node in the graph corresponds to an XML element, as shown in the graph 700 of FIG. 7. Document Object Model, or "DOM", graphs (also referred to as DOM trees) are commonly used when parsing XML documents and similar markup language documents, and enable representing and manipulating XML data. Accordingly, DOM graphs are used with preferred embodiments to capture an entire XML document using a single object graph (as illustrated by document 600 and its corresponding DOM graph 700).

Figure 8:
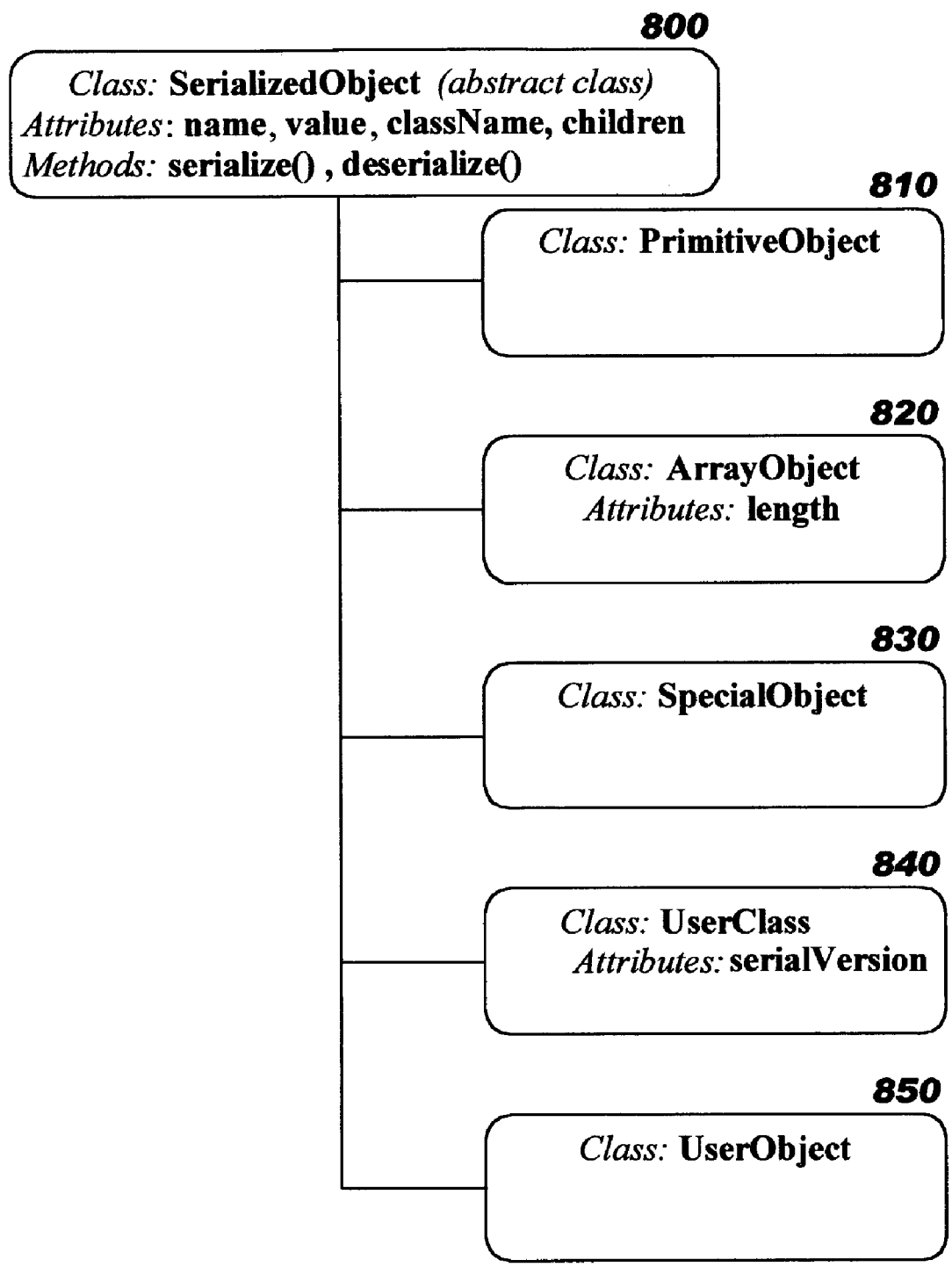
FIG. 8 depicts an abstract view of an intermediary data structure used by preferred embodiments.

An overview of the serialization techniques of preferred embodiments will now be described. (Corresponding deserialization techniques will then be described.) As shown in FIG. 2, an intermediary data structure 210 is created as a representative of the original object 200 during serialization to a text stream in XML format 220, and this intermediary data structure 210 is called a SerializedObject. The classes used for this intermediary data structure in preferred embodiments are illustrated in FIG. 8, and will now be described. (This intermediary data structure and its classes are also used in preferred embodiments for deserialization, as has been noted with reference to FIG. 4.)

The root class 800, SerializedObject, contains attributes that are common to all objects, such as the name and className attributes. Although the root class cannot be instantiated (because it is an abstract class), the derived classes 810–850, which represent specific object types, may be constructed into a heterogeneous graph. Using this approach, every serializable object can be represented using a heterogeneous graph comprising instances of the derived classes. The purpose of each derived class, according to preferred embodiments, is summarized below:

PrimitiveObject: Represents primitive objects
ArrayObject: Represents array objects
SpecialObject: Represents objects for which special processing or optimizations are desired (e.g., objects using Java serialization extensions)
UserClass: Represents the classes defining an object
UserObject: Represents objects that don't fall into any of the other categories Preferred embodiments use a "Serialized Object Model", or "SOM", which is defined herein as a heterogeneous graph comprising instances of the instantiable SerializedObject classes. As an example, a sample Java class Employee 920 is defined in FIG. 9 as an extension of a Java class Person 910. As shown at reference number 930, an object called "bill" is instantiated for Employee class. Using the SerializedObject classes defined in FIG. 8, the corresponding SOM graph 1000 for the object is shown in FIG. 10.

Figure 10:
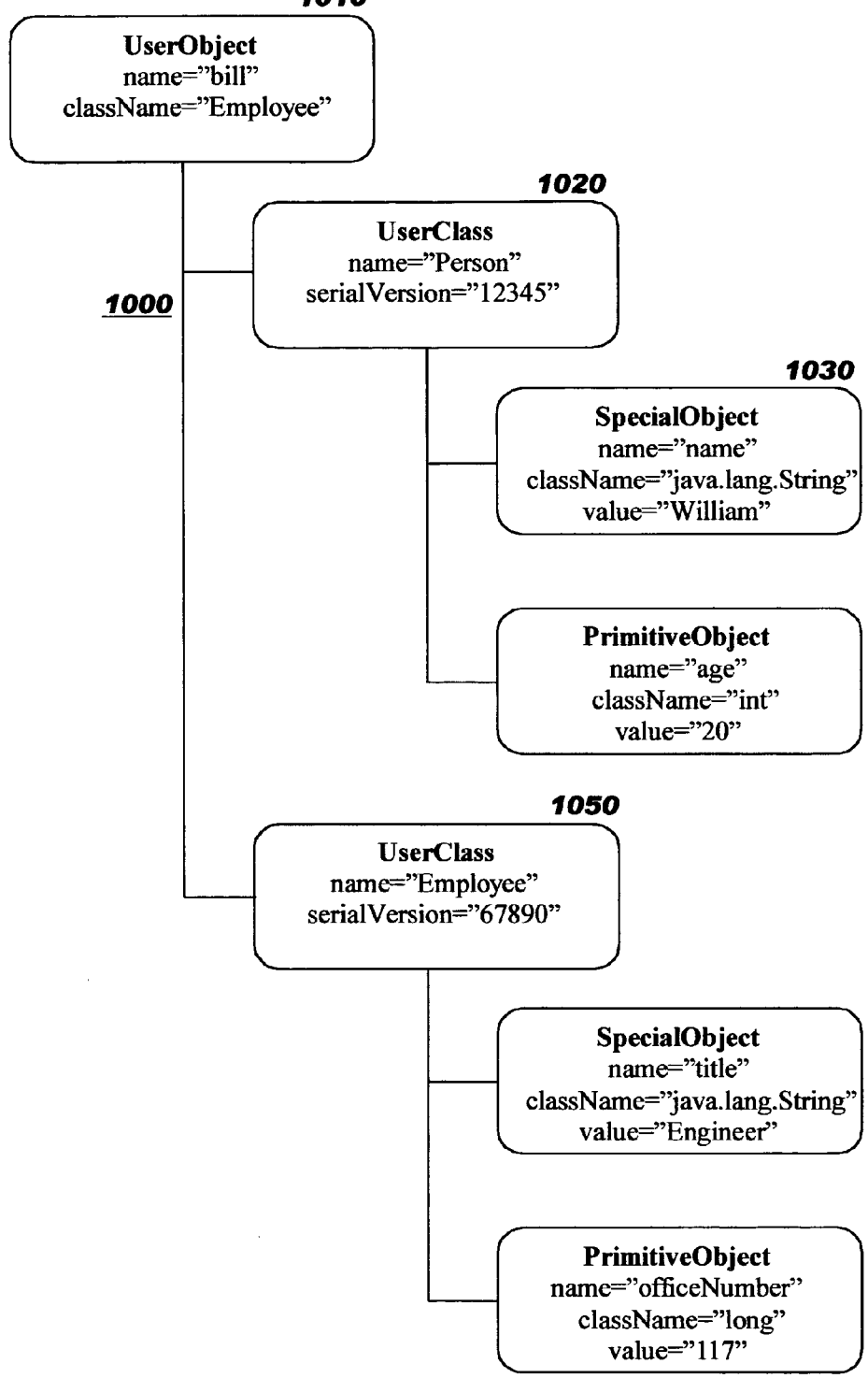

As illustrated in FIG. 10, every attribute in the Employee object 920 is represented in the SOM graph 1000, providing all the necessary information to construct the actual object during deserialization. The SOM graph also has no dependency on the existence of a specification of the Person or Employee class. The graph provides a simple, straightforward yet very advantageous representation of the underlying object. In the example depicted in FIG. 10, the SpecialObject class, rather than the UserObject class, is used to represent Java strings for optimization purposes (see the node at reference number 1030, for example), but this approach may differ from one implementation to another. (That is, an instance of SpecialObject may be created so that the internal fields of commonly-used types such as String, Vector, and ArrayList will not be further expanded. This approach enables reducing the size of the XML documents created during serialization, and also hides the internal implementation of these Java types.) The attribute names and class names of each object are stored in nodes of the SOM graph. The class serial version numbers are also recorded, as depicted in the nodes at reference numbers 1020 and 1050.

Figure 11:
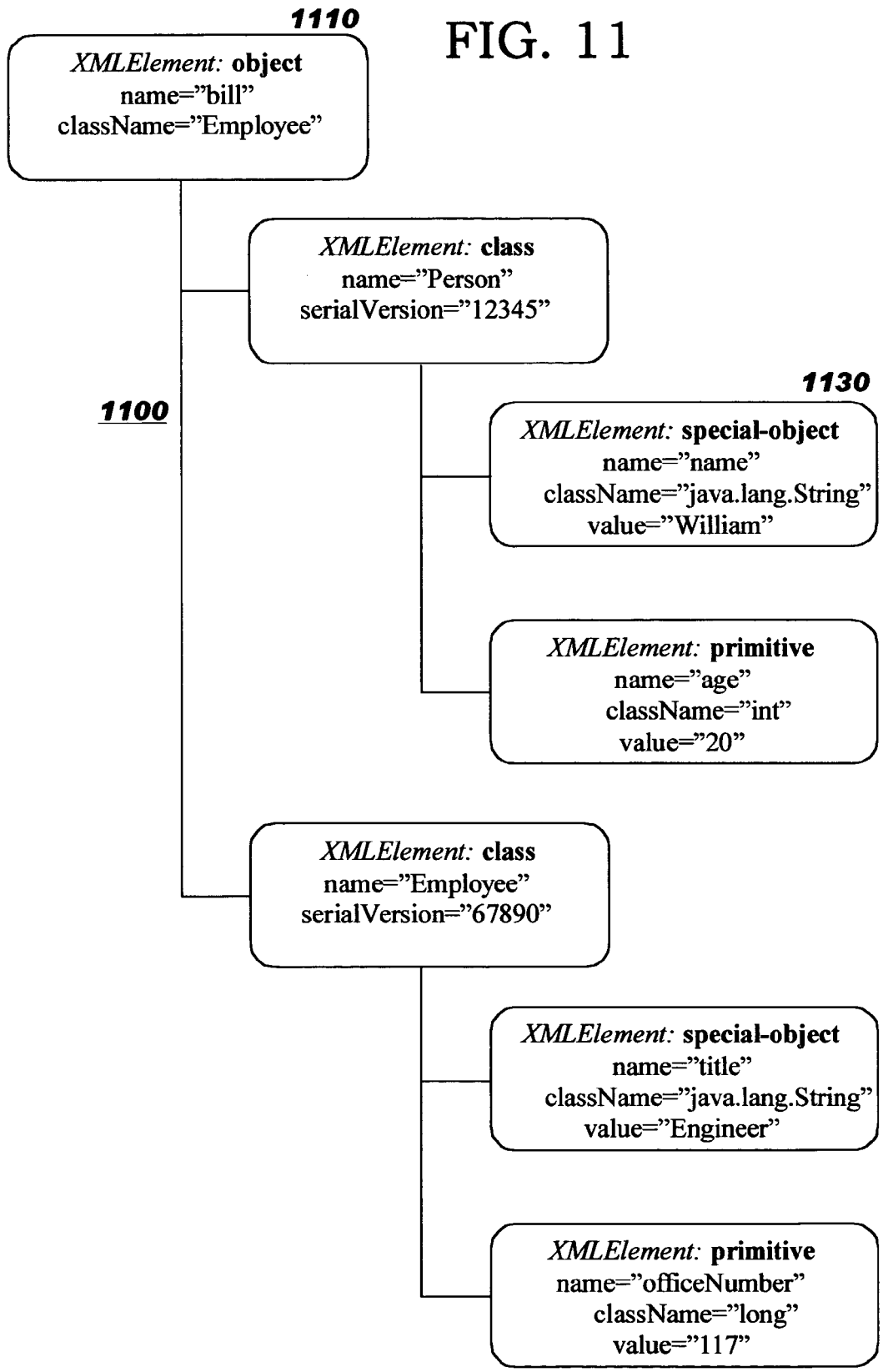

Embodiments of the present invention are adapted for creating the SOM graph for an arbitrary class definition, using the approach shown in the example of FIGS. 9 and 10. Once the SOM graph has been constructed, it can easily be transformed into an XML DOM graph by establishing a one-to-one correspondence between each node in the SOM and DOM graph. As shown in FIG. 11, the heterogeneous SOM graph 1000 of FIG. 10 can be represented with a homogeneous DOM graph 1100, where a unique XML tag is associated with each of the SerializedObject classes. For example, a tag name "object" is used in the root node 1110 of DOM graph 1100 to represent the UserObject class from node 1010 of the SOM graph 1000, and "special-object" is used as a tag name at node 1130 to represent the SpecialObject class from node 1030. Similar mappings are illustrated for the remaining class names. Preferably, the attribute names and values are simply copied from the nodes of the SOM graph to the corresponding nodes of the DOM graph, as has been shown in the example of FIGS. 10 and 11.

Finally, the XML document (from which objects are subsequently deserialized, according to the present invention) is generated by sending the DOM graph to an XML generator to write the DOM graph as an XML document. An example XML document, corresponding to the DOM graph 1100 in FIG. 11, is shown in FIG. 12.

In summary, the serialization is performed by creating the SOM graph, converting it to an XML DOM graph, and sending it to an XML generator for creation of an XML document. In preferred embodiments, the XML DOM graph may be generated directly from the object, avoiding the need to create the intermediary SOM graph. However, during deserialization, the creation of the SOM graph will be necessary so that partial deserialization capability can be provided (as discussed in more detail with reference to FIG. 13).

Figure 14:
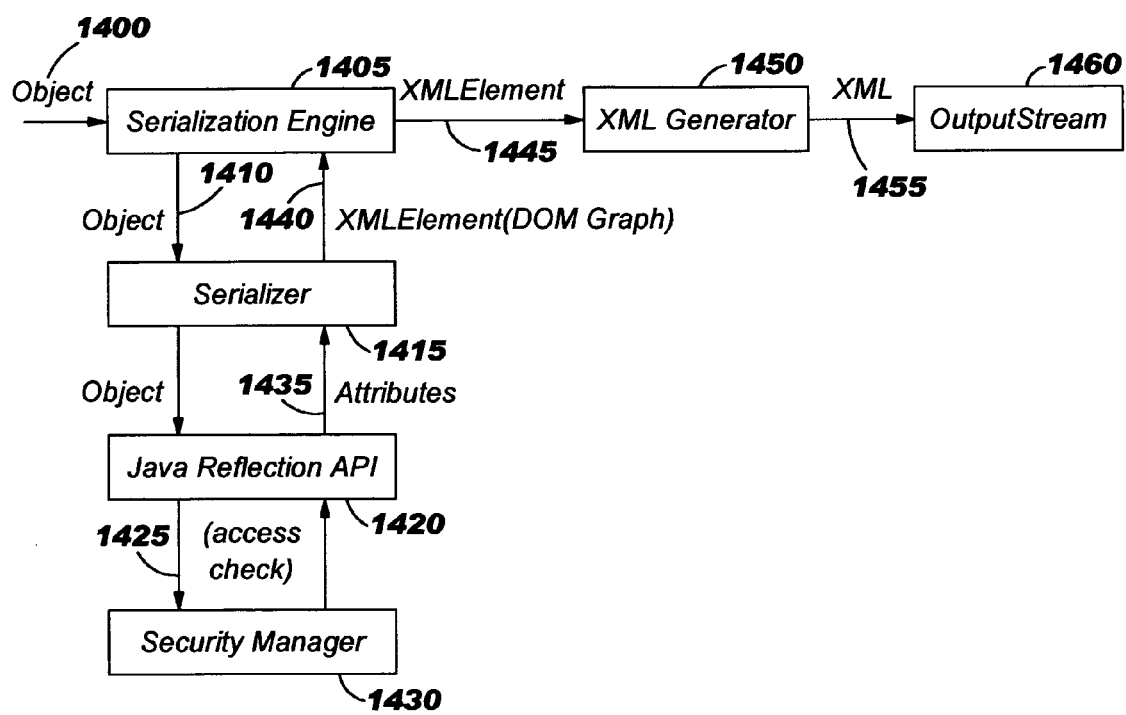
FIG. 14 illustrates components and flows of a serialization engine.
Figure 15:
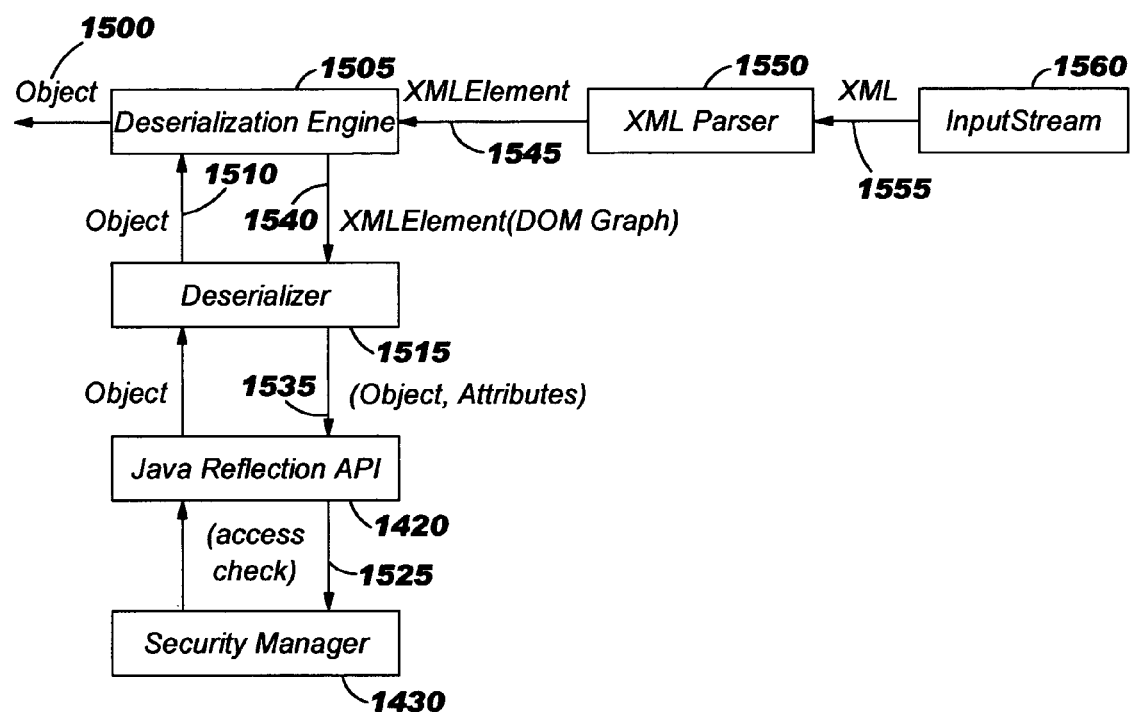
FIGS. 15–16 illustrate components and flows of a deserialization engine, according to preferred embodiments.

The serialization and deserialization of a Java object will now be described in more detail with reference to the example shown in FIG. 13 and the flows in FIGS. 14–16.

Figure 13:
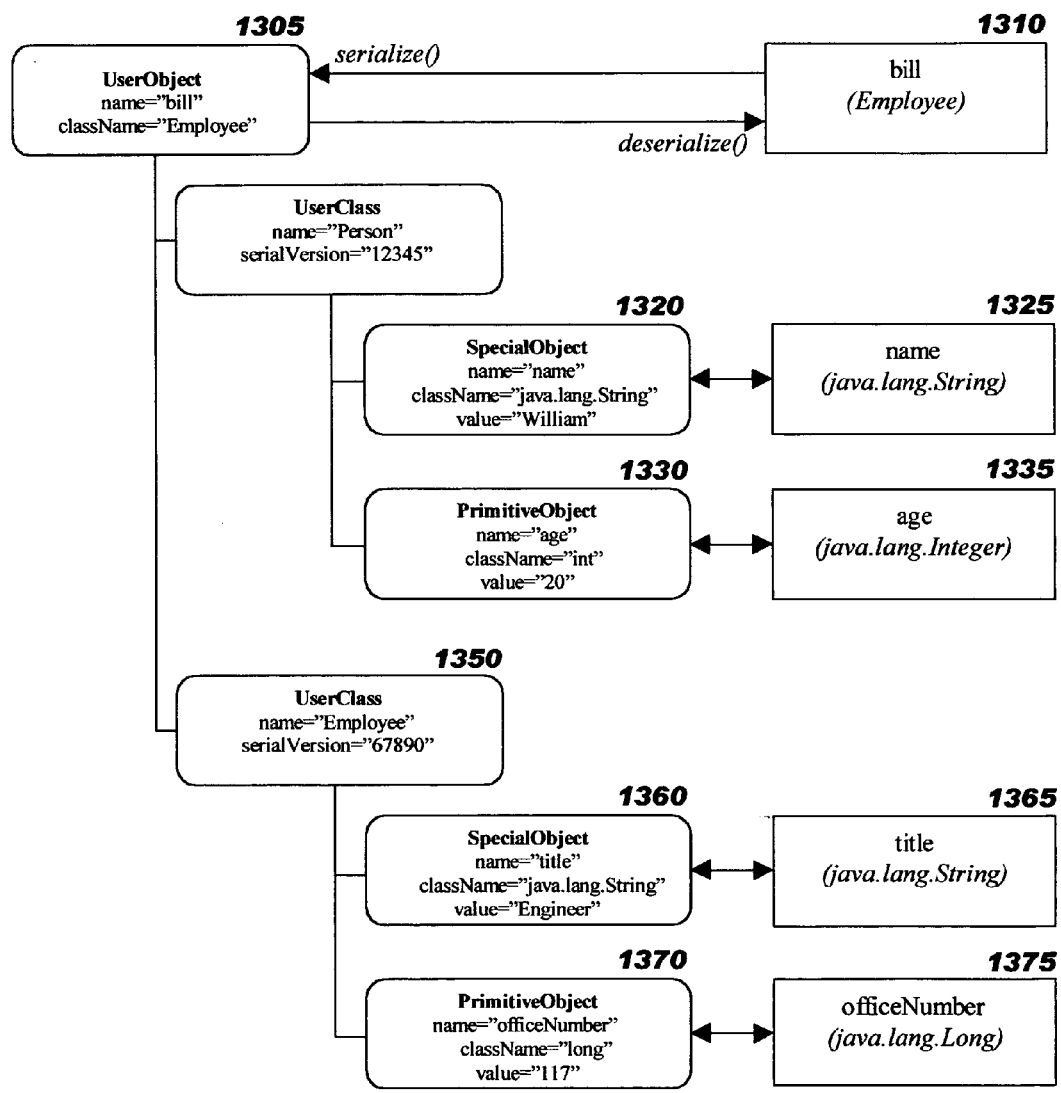
FIG. 13 illustrates the relationship between a Serialized Object Model graph and the object it represents.

FIG. 13 further illustrates the relationship between the Employee object created at reference number 930 of FIG. 9 and the corresponding SOM graph 1000 which was presented in FIG. 10. The serialization or deserialization of an object is a recursive operation that can occur at any level in the object, as will now be described.

In this example, serializing the Employee object 1310 (which was given the name "bill" when it was defined at reference number 930) recursively serializes the attributes in the Person and Employee classes to create the SOM graph having UserObject 1305 as its root. (In the sample code in FIG. 9, four attributes were defined, and these attributes are represented at reference numbers 1325, 1335, 1365, and 1375 of FIG. 13.) Conversely, deserializing the UserObject 1305 from the root of the SOM graph results in recursively deserializing the name 1320, age 1330, title 1360, and officeNumber 1370 nodes to create an Employee object 1310. However, each attribute is directly accessible to the programmer when using techniques of the present invention, and therefore deserializing individual nodes of the SOM graph results in deserializing only the corresponding individual constructs. For example, deserializing the SpecialObject 1360 in the Employee class 1350 only deserializes the title 1360 to create a java.lang.String 1365 containing the title. In summary, as illustrated by FIG. 13, serialization of an object or deserialization of a node is a recursive operation on the object/node and its children.

Because direct access to serialized attributes is provided by preferred embodiments, as noted with reference to the title attribute at 1360 and 1365, the programmer can include migration code that accesses the serialized attributes to update the corresponding class attributes if desired. (An example of updating an attribute value is depicted at reference number 2780 of FIG. 27, which is discussed in more detail below.) The term "partial deserialization" is used herein when referring to this per-attribute access capability. In contrast, prior art migration techniques require inclusion of the prior version of a class definition in order to access attribute values from serialized objects. The ability to perform partial deserialization for an object is a significant advantage of the present invention, providing the programmer with a flexible yet powerful mechanism for migrating an object from an old class definition to a new class definition. The programmer is able to construct a new object using fragments of the old object, if desired, yet does not need to write complex code to traverse the segment of the SOM graph being deserialized. So, although preferred embodiments do not require creation of the SOM graph for serialization (because the entire object will be serialized), preferred embodiments do require creation of the SOM graph for deserialization in order to support partial deserialization.

In order to serialize an object, the names and values of the attributes in an object need to be read. During this process, the SOM graph (or DOM graph, when the SOM graph is bypassed) can be constructed using these names and values. A preferred embodiment of the manner in which the present invention performs the serialization is shown in FIG. 14, and will now be described.

When the serialization engine 1405 of preferred embodiments is invoked to serialize an object 1400, the object is sent 1410 to the serializer 1415 which in turn recursively reads the public, private, and protected attributes of the object using the Java Reflection API 1420. In order to read the private and protected attributes, the Security Manager 1430 is typically invoked 1425 to validate permissions. According to preferred embodiments, appropriate modifications are made to the security policy file to grant the serialization engine the necessary permissions (such as allowing access checks to be suppressed, which may be accomplished be granting the permission suppressAccessChecks when using the Java Security Manager) to read these privileged attributes. (If there is no Security Manager registered, then Security Manager 1430 and its invocations, as well as the granting of permissions, may be omitted.)

When the object's attributes are returned 1435, the serializer 1415 then constructs an XML DOM graph from those attributes (as illustrated in FIG. 11) and returns 1440 that DOM graph to the serialization engine 1405. The serialization engine 1405 then submits 1445 this DOM graph to an XML generator 1450, which in turn writes the XML data 1455 to a stream 1460.

Note that when serializing an object, the serializer preferably observes the rules established by the standard Java serializer regarding the treatment of transient, static, and other non-serializable attributes and classes. (For example, the standard Java serializer does not serialize a number of things, such as classes which do not implement the Serializable interface, static attributes, and so forth. Preferred embodiments preferably employ an analogous approach when serializing objects to XML documents.)

When deserializing an object, the attributes in the object need to be intialized, and migration of some attributes may be necessary if the object's class definition has been changed. A preferred embodiment of the manner in which the present invention performs the deserialization is shown in FIG. 15, and will now be described.

Deserialization begins by opening an input stream 1560 on an XML document, enabling an XML parser 1550 to parse elements of XML data 1555 contained therein. These parsed elements 1545 (represented as a DOM graph, in preferred embodiments) are delivered to the deserialization engine 1505, which is responsible for deserializing the corresponding object 1500. The deserialization engine 1505 preferably sends 1540 this DOM graph representation (see, for example, DOM graph 1100 in FIG. 11) to the deserializer 1515, which instantiates and recursively initializes 1535 the attributes in the object using the Java Reflection API 1420. In order to modify the private and protected attributes, the Security Manager 1430 is preferably invoked 1525 to validate permissions (as has been discussed above with reference to FIG. 14).

Note that when deserializing an object, the deserializer preferably observes the rules established by the standard Java deserializer regarding the treatment of transient, static, and other non-serializable attributes and classes. (Refer to the discussion above regarding those things which are not serialized by the standard Java serializer.)

Figure 16:
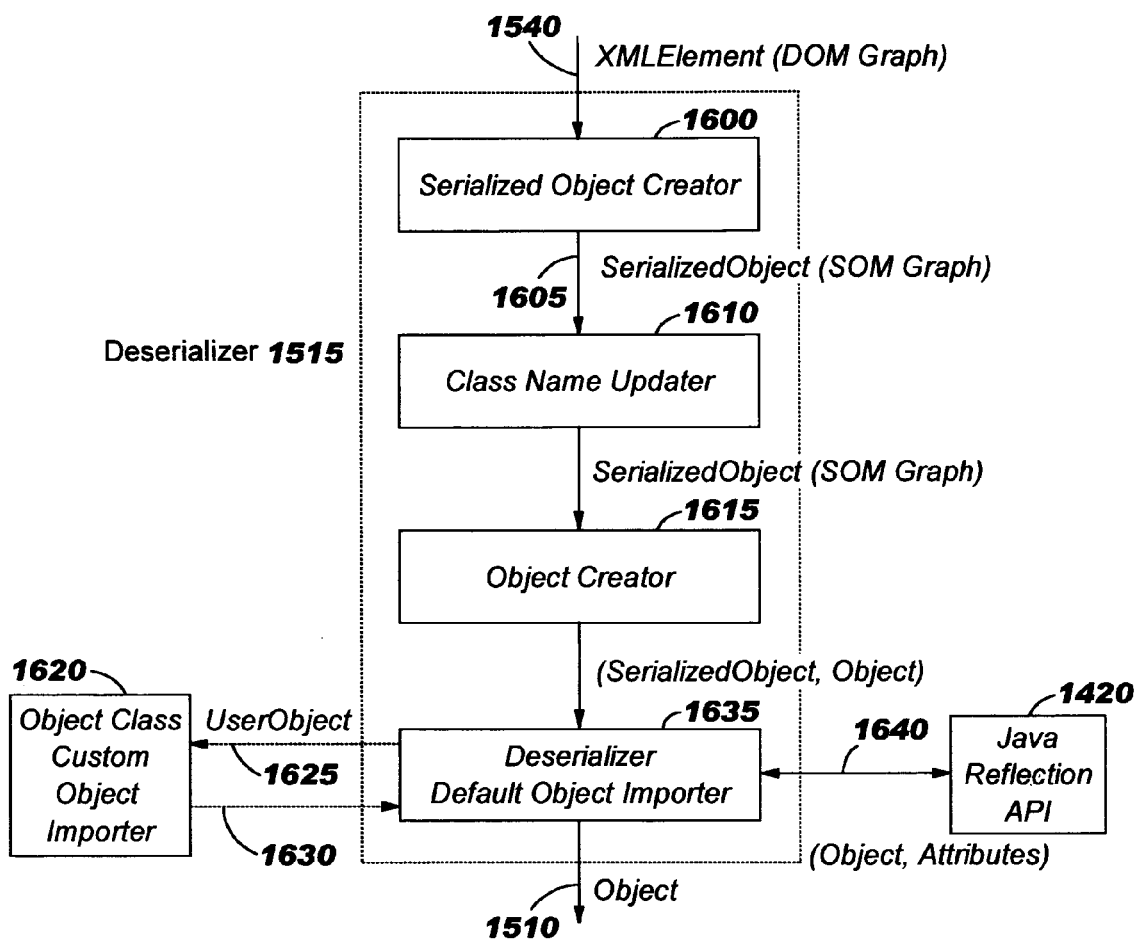

In FIG. 16, flows of the deserializer 1515 are illustrated in more detail. The deserializer first converts the DOM graph 1540 into a SOM graph 1605. An entity referred to in FIG. 16 as Serialized Object Creator 1600 performs this conversion in preferred embodiments. (Note that this conversion at 1600 is the opposite of the SOM-to-DOM conversion illustrated between FIGS. 10 and 11. As was discussed, the conversion preferably comprises using a simple mapping between statically-defined XML element names used in the DOM graph and derived class names used in the SOM graph, along with copying of attribute values from one graph to the other.)

The deserializer 1515 next invokes a module or entity referred to herein as Class Name Updater 1610 to update class names that have changed. In preferred embodiments, the deserialization engine allows the programmer to specify the class or interface which performs the updates, using (for example) helper methods provided by the SerializedObject class. For example, an invocation such as SerializedObject.changeClassName(oldName, newName) might be used, where the old and new class names are specified by the programmer as input parameters to the helper method. An example of invoking a class name change in this manner is provided at reference number 2750 in FIG. 27, which is discussed in more detail below. According to preferred embodiments, the name change is applied to all affected nodes in the SOM graph, and is carried out by inspecting the root node and then recursively inspecting all child nodes.

The deserializer 1515 next creates an instance of the object using the class name specified in the root SOM node. An entity referred to herein as Object Creator 1615 will therefore create an object from the SerializedObject intermediary data structure. In order to instantiate a Java object, a constructor must be invoked. According to preferred embodiments, the object class preferably has either a public, private, or protected zero-argument constructor. Use of a zero-argument constructor enables the deserializer of preferred embodiments to programmatically invoke the constructor for an arbitrary class. Using the Java Reflection API 1420, the deserializer can therefore create an instance of the object using the privileged constructor (and as shown at 1640, the deserializer populates the object using the corresponding attribute values from the SOM graph).

It may happen, however, that a zero-argument constructor is not provided. See, for example, reference number 2730 of FIG. 27, where a constructor for the NewEmployee class is defined as using 3 parameters. The deserializer 1515 of preferred embodiments therefore searches for the constructor having the fewest arguments. Rather than attempting to provide initial values on a per-constructor basis, if the search locates a constructor with arguments, the deserializer preferably invokes that constructor using all null arguments and dummy primitive and string values. (Alternatively, a convention may be adopted for use with an implementation of the present invention whereby a zero-argument constructor is added to each class definition, including those class definitions which also have constructors that require arguments.)

Preferably, the object is verified to have a zero-argument constructor or instantiate successfully with null arguments before it is serialized, and if not, an exception is preferably thrown. This will ensure that notification of this issue arises before deserialization is attempted. In addition, when an object is being deserialized, if the class in the root SOM node cannot be loaded, an exception should be thrown. However, if a class in a child SOM node cannot be loaded, this may be handled by skipping the corresponding attribute, allowing the programmer to provide custom migration code for this situation.

After the object has been instantiated, the deserializer 1515 begins the process of initializing the object with the corresponding attribute values from the SOM graph. If the object implements an interface indicating it wishes to perform a custom import of the SOM graph, a method from that interface (such as customObjectImport( . . . )) may be invoked to perform the custom import. See, for example, FIG. 22, where a SerializedObjectImporter interface is declared at 2210 and a customObjectImport method is specified at 2240. (In this example, details of the custom import code have not been specified—but would typically be inserted at 2250. Refer to the discussion of reference numbers 2760–2795, where an example of such code is provided.) The UserObject node from the root of the SOM sub-graph corresponding to that object is preferably passed 1625 to the custom importer logic 1620, which returns 1630 an updated object.

In preferred embodiments, use a of custom importer provides the programmer with access to methods for traversing and deserializing nodes in the SOM graph. Referring briefly to FIG. 27 (which inherits the interfaces defined in FIG. 22; see reference numbers 2200 and 2710), the custom import logic depicted at 2740 shows how the programmer can individually access nodes from the SOM graph. For example, reference number 2770 illustrates code for retrieving the "officeNumber" attribute value from a node of the SOM graph, and reference number 2795 shows how a "roles" vector can be deserialized from a child node of the SOM graph. (Note that the code in FIGS. 22 and 27 is based on a definition of Person class that differs slightly from the Person class used in the example of FIG. 9, as these examples are used independently herein.)

In addition to, or instead of, invoking the custom importer for performing specific attribute migration, a default importer may be invoked. This default importer is illustrated at 1635 in FIG. 16, and may be invoked while performing the custom import. (If the custom importer is not implemented, then the default importer will be performed.)

In preferred embodiments, the default importer works in the following manner. For each class in the SOM graph, it searches the object class hierarchy for the corresponding class. If the class is found, then the default importer recursively deserializes each child node (as illustrated at reference numbers 1325, 1335, 1365, and 1375 of FIG. 13) and assigns the value to the corresponding attribute in the class using the Java Reflection API. In preferred embodiments, the deserializer restores all attributes where the deserialized value is assignable to the class attribute, even if the attribute class names are different. (For example, java.lang.String is assignable to java.lang.Object, although the class names are different.) If a class does not exist in the object class hierarchy, that class is skipped. If an attribute does not exist in the corresponding object's class, then that attribute is skipped. In this way, the default importer performs a "best effort" attempt at restoring attribute values.

When a SOM class definition differs from the located object class definition, or there is not a one-to-one correspondence between the classes in the SOM graph and the serializable object classes, the deserializer preferably ensures that the programmer has acknowledged the difference by implementing the custom importer interface; otherwise, an exception is preferably thrown. Even if no custom code is necessary to migrate the object, the acknowledgement of the difference ensures that the programmer knows that not all attributes will be restored when the object is deserialized. As an alternative to providing a custom importer interface, the programmer may acknowledge the difference by implementing a flag interface. For example, suppose the new class definition includes one or more fields, such as revising the Person class illustrated in FIG. 27 to include a "hobbies" attribute. If the new attribute is to be defaulted to a null value, then there is no need for custom logic to establish those values in migrated objects. In that situation, rather than using the SerializedObjectImporter interface as indicated at 2210 in FIG. 22, an interface such as Importable might be used. Since migration code is not needed, this Importable interface may be provided without any methods. Upon detecting a mismatch in class definitions during deserialization, presence of the Importable interface can be used as a flag to indicate that this mismatch can be ignored.

Detection of a change in the class definition may be implemented by comparing the serial version identifier of the SOM class to the serial version identifier of the object's class. The serial version may be computed using just the serializable attributes in a class. This will ensure that changes to method signatures or to non-serializable attributes have no effect on the serial version of the class. The manner in which serial version identifiers are used in standard Java versioning support for detecting changes to a serialized object's class definition will now be described, followed by a discussion of how modifications may be made to those standard Java techniques for use with the present invention.

In the Java programming language, a built-in versioning technique for serialized objects is provided. Each serializable class may declare a variable "serialVersionUID" (hereinafter, "SUID"), which is a 64-bit long integer that will store a stream-unique identifier. Typically, the value of this variable is computed by hashing the class's signature—i.e., its name, interface class names, methods, and fields. (The details of this hashing algorithm are not pertinent to the present discussion, and will not be described in detail herein.) This standard Java versioning technique enables determining whether the class definition that a previously-serialized object conformed to when it was serialized is the same class definition currently available from the object class hierarchy. Stated in another way, if the SUID value is identical between a set of serialized objects, this is an indication that the objects share a common format for serialization and deserialization. If the SUID values do not match, then execution of standard Java deserialization to create an object using the current class definition is not allowed (thereby avoiding creation of a corrupted object).

For example, suppose the class definition for a serialized object is as shown in FIG. 17A. Objects created according to this class "ABC" therefore have two fields, "A" and "B", and the values of these two fields (an integer and a Boolean value, respectively) will be written to an output stream during serialization. Now suppose that the programmer changes the class definition 1700 for class ABC, adding a third field "C", to create a new class definition 1750 as shown in FIG. 17B. If a serialized stream has been created using class definition 1700, and code using class definition 1750 attempts to deserialize that stream, there will be no value for the newly-added string field "C". FIG. 17C illustrates the prior art technique of adding a sample SUID value 1790 to class definition 1750. Because the SUID is computed over the class definition, each of the versions 1700, 1750 of class ABC will have a different value for the SUID, thereby allowing standard Java versioning to automatically detect that the class definitions are different. Because these prior art SUIDs are computed over the entire class signature, different SUID values will result from changes to attributes that are never serialized.

On the other hand, preferred embodiments of the present invention preferably compute an SUID over only the serializable attributes of an object. Accordingly, the SUID comparison performed by preferred embodiments of the present invention detects incompatibility arising from change to serialized attributes. In one approach, the computation of SUIDs over the serializable attributes may be implemented by extending the existing Java versioning. As another approach, this modified computation of an SUID value may be carried out using logic which is newly-created for use with an implementation of the present invention.

As yet another approach, rather than using SUID values to detect incompatibility between a class definition and previously-serialized objects, a field-by-field comparison may be made between the SOM graph for a serialized object and the corresponding class definition for that object when a deserialization operation is being performed, thereby determining whether the class definition has changed.

Referring now to FIGS. 18–29, examples are provided to illustrate how the serialization and deserialization engines may be implemented in preferred embodiments.

The serialization and deserialization engines may be implemented as classes, in an analogous manner to Java's ObjectInputStream and ObjectOutputStream classes. Within these engines, the serializer and deserializer may be implemented as an interface which may be specified (when the engines are constructed) in a form such as new XMLObjectOutputStream(ostream, myCustomSerializer).

Figure 18:
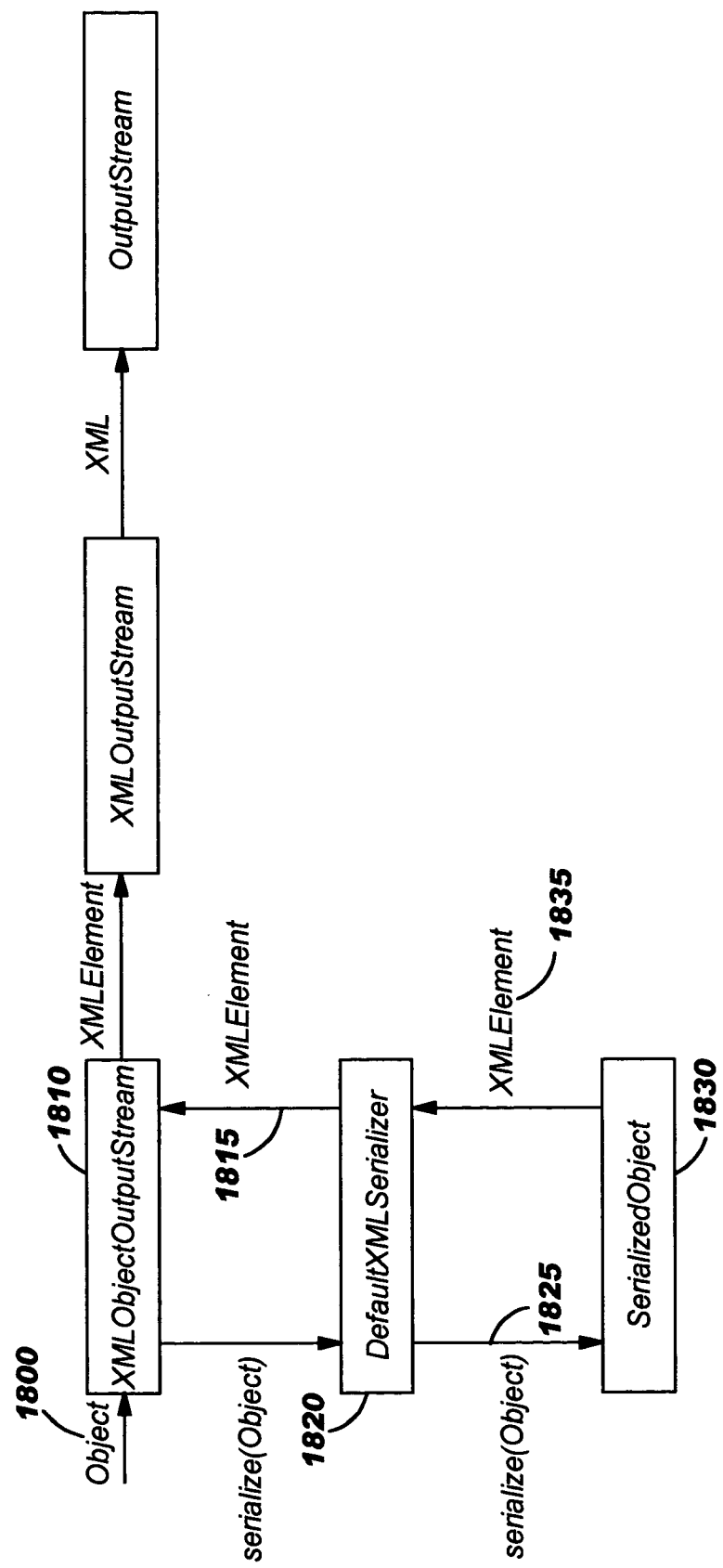
FIGS. 18–19 provide further detail regarding components and flows of the serialization engine, and FIGS. 20–21 provide further detail regarding components and flows of the deserialization engine, according to preferred embodiments.

In the example shown in FIG. 18, the DefaultXMLSerializer class 1820 implements the interface used by the XMLObjectOutputStream 1810 to serialize an object 1800. After being invoked with object 1800, the serializer returns 1815 an XML DOM graph. In this process, the DefaultXMLSerializer 1820 of preferred embodiments invokes 1825 a static serialize( ) method in the SerializedObject class 1830 to create this XML DOM graph (represented in FIG. 18 by XMLElement 1835). (Whereas FIGS. 14–16 depicted abstract entities, FIGS. 18–21 illustrate actual classes that may implement the described functionality.)

Figure 19:
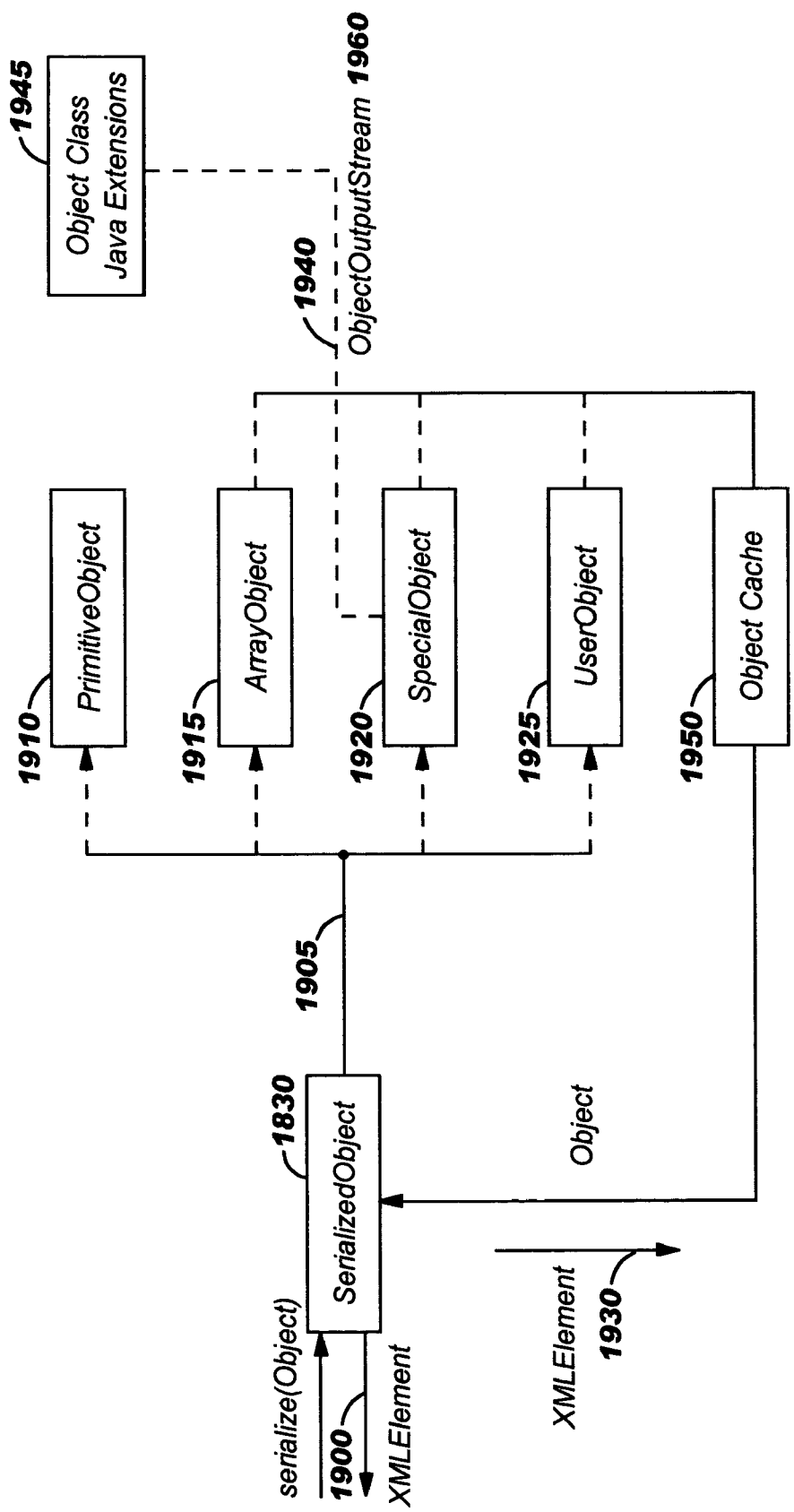

Referring now to FIG. 19, operation of the SerializedObject 1830 is depicted in more detail. Upon invocation, SerializedObject 1830 queries 1905 one or more of the derived classes 1910–1925, as necessary, to determine the type of object, and then invokes the appropriate class to perform the serialization. The derived class may recursively invoke the SerializedObject again to serialize child elements. (The PrimitiveObject, however, can never recurse because a primitive value cannot contain references to other objects. Note also that the derived UserClass is not present in FIG. 19 or FIG. 21 because, in preferred embodiments, that class is used for organizational purposes and not as an independent entity.)

For example, if the object being serialized is an array of java.lang.String, the SerializedObject 1830 invokes 1905 the static serialize( ) method in the ArrayObject class 1915. For each string in the array, the ArrayObject 1915 invokes the SerializedObject again, which in turn invokes the SpecialObject 1920 to serialize the string. Using this approach, the ArrayObject creates a DOM graph comprising a parent node and the child nodes returned from the SpecialObject. In this way, the entire DOM graph (returned at 1900 in FIG. 19) is constructed in a recursive manner. (Recursion is denoted generally in FIG. 19 by reference number 1930.)

An object cache 1950 is preferably maintained to keep track of objects that have already been serialized. This ensures that the serializer does not recurse indefinitely when circular references (such as linked lists, which deliberately contain circular references such as next and previous) are encountered, and preferably establishes a reference number to identify each previously-serialized object. The reference number, which is stored in the DOM graph, may be used during deserialization to preserve commonality of references.

Support for serialization extensions is an optional aspect of the present invention. If support for Java serialization extensions is desired, the SpecialObject 1920 may invoke 1940 the appropriate extensions 1945 (such as writeObject( ), writeExternal( ), and so forth) when appropriate. In this case, the Java ObjectOutputStream class (see reference number 1960) is preferably extended and passed to the extension code 1945 to intercept the methods invoked by the extension code, in order to incorporate the extension data into the DOM graph of SpecialObject 1920. Note that there are many Java serialization extensions, of which writeObject( ) and writeExternal( ) are the most common. Depending on the nuances of particular extensions, it may not be possible in some cases to fully support emulation of the serialization extension using the techniques of preferred embodiments.

Figure 20:
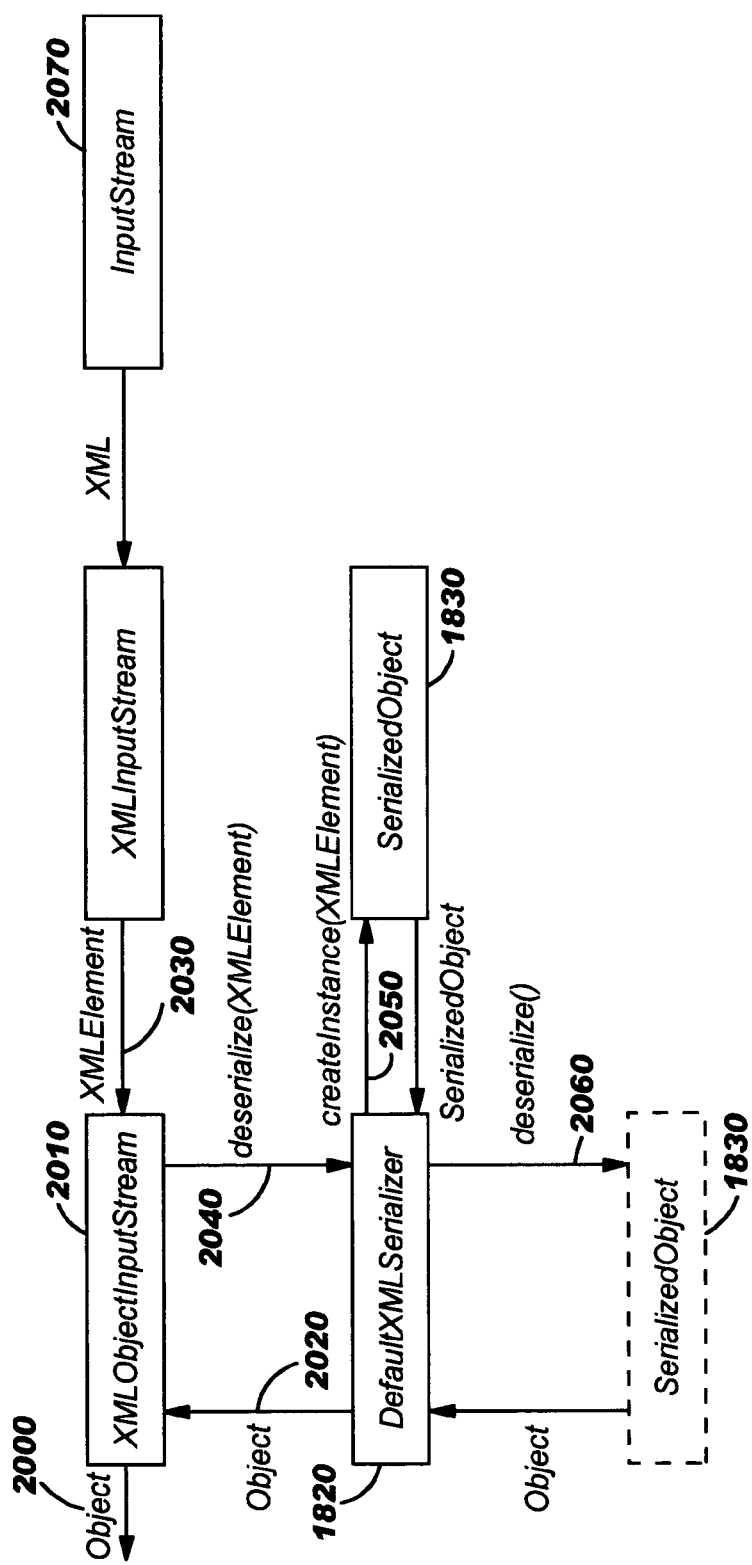

FIG. 20 illustrates one manner in which the deserialization of objects may be implemented, As shown therein, the DefaultXMLSerializer class 1820 implements the interface used by the XMLObjectInputStream 2010 to deserialize an object 2000 from an XML DOM graph 2030 which is read from an input stream 2070. The deserializer is invoked 2040 with the XML DOM graph and returns 2020 an object.

The DefaultXMLSerializer 1820 invokes 2050 the static createinstance( ) method in the SerializedObject class 1830 to convert the DOM graph to a SOM graph. The root node of the SOM graph will be one of the four derived classes (ie. PrimitiveObject, ArrayObject, SpecialObject, UserObject). After class names have been updated, if necessary (i.e., if class names have been changed), the DefaultXMLSerializer 1820 invokes 2060 the non-static deserialize( ) method at the root level of this SOM graph to perform a full deserialization of the object and its child objects (as discussed above with reference to FIG. 13). The SerializedObject class 1830 is depicted in FIG. 20 using a dashed outline. This signifies that, according to preferred embodiments, what is invoked is actually an instance of this class, as determined by the current object type. (Note that the DefaultXMLSerializer class 1820 is depicted in both FIGS. 18 and 20. As an alternative to using the same class for the serializer and in the deserializer, separate classes may be used without deviating from the scope of the present invention.)

Figure 21:
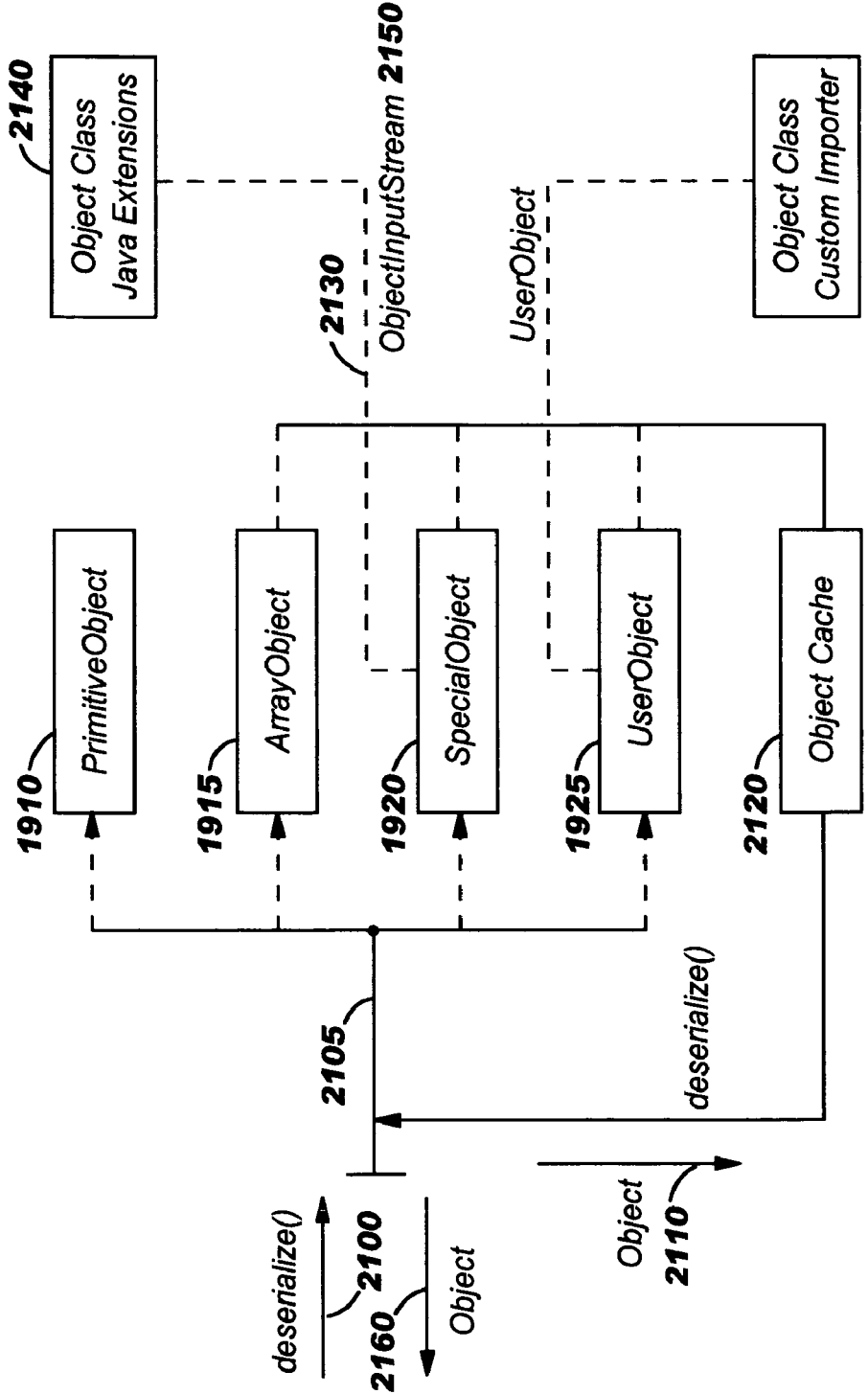

Referring now to FIG. 21, the derived class 1910–1925 that is invoked to begin the deserialization will depend on the type of object being deserialized, as has been discussed with reference to the serialization techniques in FIG. 19. The derived class may recursively invoke the other derived classes again to deserialize child nodes (as indicated generally by reference number 2110), except that the PrimitiveObject can never recurse because a primitive value cannot contain references to other objects.

For example, if the object being deserialized is an array of java.lang.String, the DefaultXMLSerializer 1820 invokes 2100, 2105 the non-static deserialize( ) method in the ArrayObject class 1915. (Note that the deserialize( ) method is invoked directly on the appropriate derived class, as shown by reference numbers 2100, 2105.) For each child node in the SOM graph, the ArrayObject 1915 invokes its deserialize( ) method, which invokes the SpecialObject class 1920 to deserialize the string (as was discussed with reference to 1300 and 1325 of FIG. 13). Using this approach, the ArrayObject 1915 is able to create and populate an array using the java.lang.String objects returned from the SpecialObject 1920. In this way, the entire array (illustrated by object 2160 which is returned in FIG. 21) is constructed in a recursive manner.

An object cache 2120 is preferably maintained to keep track of objects that have already been deserialized, in an analogous manner to the object cache 1950 described with reference to FIG. 19. This establishes an object for each reference number and may be used to preserve commonality of references. For simplicity, the SOM graph may be constructed with circular references, allowing multiple parent nodes to share the same child node. This ensures that the deserializer does not recurse indefinitely when circular references are encountered during the creation of the SOM graph. For example, if a UserClass contains two attributes that reference the same array, both attributes would point to one instance of the ArrayObject when using this approach, rather than having cloned objects that should be references.

If the optional aspect providing support for Java serialization extensions is implemented, as discussed above with reference to FIG. 19, the SpecialObject class 1920 may invoke 2130 the appropriate extensions 2140 (such as readobject( ), readExternal( ), and so forth) when appropriate. In this case, the ObjectInputStream class (see reference number 2150) is preferably extended and passed to the extension code 2140 to intercept the methods invoked by the extension code, in order for the extension code to read the data of SpecialObject 1920. Note that it may not be possible emulate all serialization extensions, as has been discussed.

As explained earlier, if the object implements an interface indicating it wishes to perform a custom import of the SOM graph, the object is invoked to perform the custom import. The UserObject 1925 passed to the custom importer should provide the programmer with the methods that can be used to traverse and deserialize nodes in the SOM graph. The object may also invoke the default importer while performing the custom import. (Refer to the discussion of FIG. 16, above, where custom object importer 1620 is described.)

Several source code implementation examples will now be described with reference to FIGS. 22–29. The object stream classes, XMLObjectInputStream and XMLObjectOutputStream, previously discussed herein are used in the following examples to illustrate a working implementation of preferred embodiments.

In this example, the classes in FIGS. 22–23 are defined, and the sample code 2400 in FIG. 24 is executed. The output 2500 in FIG. 25 is displayed when the sample code 2400 is executed. The sample code in FIG. 22 specifies a Person class 2200, where instances of this class have attributes GUEST_ACCOUNT, name, address, and accounts. See reference number 2220. Notably, Person class implements the Serializable interface, indicating that this class can be serialized (as shown at 2210). The sample code in FIG. 23 defines Employee class 2300 as an extension of Person class 2200, and therefore instances of Employee class are also serializable. In addition to the attributes defined by Person class, instances of Employee class also have officeNumber, emailAddress, creationDate, and roles attributes (as declared at 2310).

Sample code 2400 in FIG. 24 creates a new instance of Employee class 2300 at reference number 2410, and the name, address, officeNumber, and emailAddress attributes of this instance are initialized using the 4-attribute constructor defined at 2320 in FIG. 23. The code at 2420 invokes a method to print contents of the newly-constructed object. FIG. 25 shows these attribute values at 2510 (including default values which have been created according to the code at 2330 in FIG. 23). Next, the code at 2430 serializes this object using techniques disclosed herein, after which the object is discarded 2440. The serialized object is then deserialized 2450 as an object using the same Employee class definition. As shown in the output at 2520, all attributes in the deserialized object are restored completely. Although the Person class 2200 in this example implements the SerializedObjectImporter interface, as discussed with reference to 2210 in FIG. 22, it is not necessary in this example because the class definition is unchanged when the object is deserialized at 2450. (The next example, discussed below with reference to FIGS. 27–29, will illustrate the use of the SerializedObjectImporter interface.)

The XML output generated when serializing the Employee object at 2430 is shown in FIG. 26. In this example document 2600, the root 2610 is an element named "serialized", which in preferred embodiments has attributes that indicate the format and version of the XML content. The actual object being serialized is wrapped in this element. The class hierarchy of the object is stored as a sequence of elements which in turn contain the fields of each class. Thus, element 2620 indicates that this serialized object is an instance of Employee class, and elements 2630 and 2640 indicate that attributes of the object adhere to the class definitions Employee and Person, respectively.

The serial version number of each class is preferably stored as an attribute of the class elements, as shown at 2631 and 2641, so that it can be verified when the object is being deserialized. If the serial version number of a serialized object does not match the serial version number of the class identified in the object element, the underlying class definition of the object will be required to implement the SerializedObjectImporter interface. An implementation of this interface is an acknowledgement by the object that its definition has changed. For example, the class elements at 2630 and 2640 specify the names of classes used by the serialized object 2600. If the serial version numbers specified at 2631 or 2641 do not match the presently-existing serial version numbers for those classes when document 2600 is to be deserialized, then according to preferred embodiments, the Employee object 2620 cannot be deserialized unless either the Employee class 2300 or Person class 2200 implements the SerializedObjectImporter interface, respectively. For simplicity, the SerializedObjectImporter interface may always be initially implemented on the same class as the Serializable interface, then overridden and chained in each sub-class when necessary (as illustrated in FIG. 27 at reference number 2740), thereby creating a loosely-coupled chain of classes performing the custom import. Using Java reflection, the deserializer may also ensure that each differing class has the interface method defined therein, in the event that a differing class inherits the interface method from a parent class. (While the interface can be implemented on any class, because existence of the interface in the class hierarchy would make the object an instance of that interface, it is preferable to override the interface method for each class that changes, thereby providing an organizational approach that allows each class to accommodate its own changes. Overriding the interface method for each changed class is also advantageous when private attributes in super-classes need to be manipulated. Alternatively, a single class may be responsible for performing the migration of all super-classes.)

A special-object element is recognized by the deserializer as a serialized object that will be constructed during deserialization using a constructor or initializer methods. See elements 2632 and 2642, where special-object elements are used for serializing vectors. As mentioned earlier, special objects are used in preferred embodiments to avoid expanding the internal fields of commonly-used Java objects such as String, Vector, and ArrayList. This helps reduce the size of the XML output and hides the internal implementations of these Java objects. The special-object is also preferably used for Java objects that do not have zero-argument constructors. If the classes of the objects being serialized are known in advance, then in preferred embodiments, an implementation of the present invention need only handle applicable Java objects. (In this sample implementation, Java serialization extensions are not supported.)

The reference attribute in a serialized object such as that represented by document 2600, as stated earlier, helps maintain commonality between objects. In this example, the GUEST_ACCOUNT variable in the Person class is linked to an object in the accounts vector. See the code at 2230 in FIG. 22, where this link is established. As a result, the same reference number (8) is used in the XML elements for those entities; see reference numbers 2643 and 2644 in FIG. 26. This ensures that the restored (i.e., deserialized) object will not contain cloned references to the array. The reference attribute also ensures the elimination of infinite recursion when serializing objects like linked lists which deliberately contain circular references (e.g., next, previous).

The object stream classes depicted in FIGS. 18 and 20 may also be used to serialize objects using standard Java serialization, where the serialized object is then stored in an XML representation such as that shown in FIG. 26, although this has not been illustrated. For example, the binary stream created when serializing an object using standard Java serialization could be encoded as the (textual) value of the value attribute of a special-object element. This may be advantageous, for example, if Java serialization needs to be maintained for certain objects.

Turning now to FIG. 27 (which comprises FIGS. 27A and 27B), the Employee class 2300 from FIG. 23 is redefined and renamed NewEmployee (see reference number 2710). The redefined attribute values are specified at 2720. As shown therein, as contrasted to the definitions at 2310 in FIG. 23, the officeNumber attribute has been modified to use a String type (instead of integer); the emailAddress attribute has been deleted; a title attribute has been added; the creationDate attribute has been renamed as a dateHired attribute; and the roles attribute has been redefined to use a different type. The NewEmployee constructor 2730 in this example uses 3 arguments.

The custom import logic 2740 in this example includes code 2750 for changing the class name, and the statement at 2760 tests (preferably, using the serial version number or identifier, as has been described) to see if the class of the serialized object is different from the existing class definition for that object. In this example, migration of only one prior version of the object is supported. If migration of multiple prior versions is to be supported, then a version attribute is preferably added to the class, and the migration code then preferably checks this attribute when performing the migration. If the class definitions are different, then the migration logic comprising statements 2770–2795 is executed to migrate the previously-serialized object, as will now be described with reference to FIGS. 28 and 29.

The sample code 2800 in FIG. 28 may be executed against the XML file containing the serialized Employee object 2600 (see FIG. 26) to read the Employee object into a NewEmployee object. See reference number 2810, where a readObject method is invoked (using empty string values, in the absence of a zero-argument constructor for NewEmployee class, for a pre-instantiated object). Since Person class implements the SerializedObjectImporter interface, as shown at 2210 in FIG. 22, the SerializedObject class will call that interface method when it is deserializing the NewEmployee object (at 2810 in FIG. 28). The output 2900 of the sample code 2800 is displayed in FIG. 29. As shown in the output, the content of the Employee object is successfully migrated to the NewEmployee object. In particular, note that the contents of the emailAddress attribute have now been merged into the new title attribute, as shown at 2910, according to the migration logic specified at 2780 in FIG. 27. (Other changes, such as renaming the "creationDate" attribute to a "dateHired" attribute, illustrated at 2790, are also performed.)

Since the NewEmployee class 2700 implements the SerializedObjectImporter interface, the deserializer calls it when it is deserializing the NewEmployee object from the XML document 2600. The default importer successfully restores the contents of the Person object, which has not changed in this example, but it is the custom deserialization code (see reference numbers 2770–2795) that handles the new and changed fields of NewEmployee class (such as officeNumber, title, and so forth). Also, note that when calling XMLObjectInputStream.readObject( ) (see reference number 2810 of FIG. 28), an instance of the NewEmployee class is supplied as a parameter. This prevents the deserializer from creating an instance of the Employee object. Alternatively, the DefaultXMLSerializer may have been extended to change the class name before deserialization.

In FIG. 30 a sample grammar that defines the XML format of a serialized object for this sample implementation is shown. The grammar is simple and represents every possible SOM graph configuration. In Appendix A, which is incorporated herein by reference, a sample application programming interface ("API") specification which may be used by an implementation of the present invention is documented.

Preferred embodiments of the present invention operate to transparently migrate serialized objects during normal product operation, thereby efficiently reflecting revised class definitions in the deserialized objects. Techniques which have been disclosed herein are easy to use and extendable, and may be employed for migrating arbitrary forms of objects even though extreme changes may have been made to classes used in those objects. To incorporate an implementation of the present invention into an existing code base, invocations of the Java serialization classes can simply be replaced with the XML object stream classes illustrated herein, thereby easily replacing Java serialization with XML serialization for all objects to be serialized. When using techniques disclosed herein, no dependency exists on having access to the original class definitions for performing deserialization.

Commonly-assigned and co-pending U.S. patent application Ser. No. 10/457,199 (filed Jun. 9, 2003), titled "Maintaining Multiple Valid Concurrent Serialized Object Versions", discloses techniques for concurrently maintaining serialized objects that were created from more than one version of a class definition. According to preferred embodiments of this commonly-assigned application, a component programmatically maps and enforces multiple valid versions of stream-unique version identifiers for a collection of class definitions (such as the classes of a software product that is undergoing change from one product version to another). This component programmatically detects when an object's stream-unique version identifier value does not match the code attempting to deserialize the object, and then programmatically determines whether the object is compatible with the code even though the stream-unique version identifier values do not match. Preferably, this determination is made by consulting a stored mapping, in which the stream-unique version identifiers of compatible versions have been recorded. This commonly-assigned application does not teach the techniques disclosed in the present application.

While preferred embodiments have been described with reference to the Java programming language and features thereof, the teachings disclosed herein may be adapted for use with similar features of other programming languages, without deviating from the scope of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to block diagrams of methods, apparatus (systems), and computer program products according to embodiments of the invention. It will be understood that each block of the block diagrams, and combinations of blocks in the block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of serializing software objects, comprising steps of:
   creating, for an object to be serialized to a persistent store, a graph structure comprising nodes that embody serializable attributes and values thereof;
   writing the graph structure to the persistent store as a markup language document, wherein the markup language document reflects one or more original class definitions to which the object for which the graph structure was created adheres; and
   deserializing a new instance of the object from the markup language document, further comprising the steps of:
      creating a second graph structure from the markup language document;
      programmatically determining whether serializable attribute definitions for one or more current class definitions to which the new instance adheres are identical to the serializable attribute definitions for the original class definitions, as reflected in the second graph structure, and if not, performing a programmatic migration of the attribute values in the second graph structure; and
      deserializing the new instance from the serializable attributes and values embodied in the second graph structure.

2. The method according to claim 1, wherein the markup language document is encoded in Extensible Markup Language ("XML") notation.

3. The method according to claim 1, wherein the nodes are written as markup language elements in the markup language document.

4. The method according to claim 1, wherein the nodes reflect a structure of the object according to the one or more original class definitions.

5. The method according to claim 4, wherein the structure of the object is reflected in hierarchical relationships among markup language elements of the markup language document.

6. The method according to claim 5, wherein the attribute values are reflected in attributes of the markup language elements.

7. A method of enabling serialized objects to be preserved following changes to one or more class definitions used in those objects, comprising steps of:
creating, for an object to be serialized to a persistent store, a graph structure comprising nodes that embody a structure of the object and values of serializable attributes of the object;
writing the graph structure to the persistent store, such that serializable information from one or more original class definitions to which the object adheres is persistently captured therein;
programmatically determining, in order to deserialize the persistently captured information to a new instance of the object, whether serializable attribute definitions for the original class definitions, as reflected in the graph structure, are identical to serializable attribute definitions of one or more current class definitions to which the new instance must adhere; and
deserializing the new instance of the object directly from the serializable information persistently captured within the graph structure, if the programmatically determining step has a positive result, and performing a programmatic migration of the attribute values from the serializable information persistently captured within the graph structure otherwise, wherein the programmatic migration further comprises directly accessing individual attribute values from the persistently-captured serializable information.

8. The method according to claim 7, wherein the writing step further comprises writing the graph structure to the persistent store as a markup language document.

9. The method according to claim 7, wherein the directly accessing does not require access to a programming language specification of the one or more original class definitions.

10. A method of deserializing software objects, comprising steps of:
creating, from a markup language document written to a persistent store, a corresponding graph structure, wherein elements of the markup language document and nodes of the corresponding graph structure embody serializable attributes and values of an object and wherein the markup language document reflects one or more original class definitions to which the object adhered when the markup language document was created; and
deserializing a new instance of the object from the graph structure, further comprising the steps of:
programmatically determining whether serializable attribute definitions for one or more current class definitions to which the new instance adheres are identical to the serializable attribute definitions for the original class definitions, as reflected in the graph structure, and if not, performing a programmatic migration of the attribute values in the graph structure, wherein individual ones of the attribute values are directly accessed from the graph structure; and
deserializing the new instance from the serializable attributes and values embodied in the graph structure.

11. A data structure for enabling serialized objects to be preserved following changes to one or more class definitions used in those objects, the data structure embodied on a computer-readable medium and comprising a markup language specification of a structure of an object according to one or more original class definitions to which the object adheres and values of serializable attributes of the object, according to the one or more original class definitions, such that the data structure is usable for deserializing a new instance of the object according to one or more current class definitions to which the new instance must adhere by creating a graph structure from the markup language specification; programmatically determining whether serializable attribute definitions for the one or more current class definitions are identical to serializable attribute definitions for the one or more original class definitions, as reflected in the graph structure, and if not, performing a programmatic migration of the attribute values in the graph structure by directly accessing individual attribute values from the graph structure; and deserializing the new instance from the serializable attributes and values embodied in the graph structure.

12. A system for serializing software objects, comprising:
means for creating, for an object to be serialized to a persistent store, a graph structure comprising nodes that embody serializable attributes and values thereof;
means for writing the graph structure to the persistent store as a markup language document, wherein the markup language document reflects one or more original class definitions to which the object for which the graph structure was created adheres; and
means for deserializing a new instance of the object from the markup language document, further comprising:
means for creating a second graph structure from the markup language document;
means for pro grammatically determining whether serializable attribute definitions for one or more current class definitions to which the new instance adheres are identical to the serializable attribute definitions for the original class definitions, as reflected in the second graph structure, and if not, performing a programmatic migration of the attribute values in the second graph structure; and
means for deserializing the new instance from the serializable attributes and values embodied in the second graph structure.

13. A computer program product for deserializing software objects, the computer program product embodied on one or more computer-readable media and comprising:
computer-readable program code for creating, from a markup language document written to a persistent store, a corresponding graph structure, wherein elements of the markup language document and nodes of the corresponding graph structure embody serializable attributes and values of an object and wherein the markup language document reflects one or more original class definitions to which the object adhered when the markup language document was created; and computer-readable program code for deserializing a new instance of the object from the graph structure, further comprising:
    computer-readable program code for programmatically determining whether serializable attribute definitions for one or more current class definitions to which the new instance adheres are identical to the serializable attribute definitions for the original class definitions, as reflected in the graph structure, and if not, performing a programmatic migration of the attribute values in the graph structure, wherein individual ones of the attribute values are directly accessed from the graph structure; and
    computer-readable program code for deserializing the new instance from the serializable attributes and values embodied in the graph structure.

* * * * *